US006696640B1

(12) United States Patent
Castellani et al.

(10) Patent No.: US 6,696,640 B1
(45) Date of Patent: Feb. 24, 2004

(54) QUAD RECEPTACLE, DUAL CIRCUIT FLUSH POKE-THROUGH WIRING FITTING WITH INTERNALLY MOUNTABLE COMMUNICATION/DATA JACKS

(75) Inventors: Norman Castellani, Edenton, NC (US); John Kohaut, Port Murray, NJ (US); Richard Lee Arthur, Parkersburg, WV (US); Shailesh Shashikant Bambardekar, Vienna, WV (US)

(73) Assignee: Walker Systems, Inc., Williamstown, WV (US)

( * ) Notice: Subject to any disclaimer, the term of this patent is extended or adjusted under 35 U.S.C. 154(b) by 0 days.

(21) Appl. No.: 09/642,951

(22) Filed: Aug. 21, 2000

Related U.S. Application Data

(60) Provisional application No. 60/150,285, filed on Aug. 23, 1999.

(51) Int. Cl.[7] .................................................. H02G 3/04

(52) U.S. Cl. .......................... 174/48; 174/50; 52/220.8; 220/3.3

(58) Field of Search ............................. 174/48, 50, 57, 174/49, 51, 53, 54; 52/220.8, 220.5, 220.7; 220/3.3, 3.5, 3.7; D13/137; 439/535, 536, 650

(56) References Cited

U.S. PATENT DOCUMENTS

| | | | |
|---|---|---|---|
| 1,318,733 A | 10/1919 | Eckstein | |
| 1,717,836 A | 6/1929 | Connor | |
| 3,975,075 A | 8/1976 | Mason | 339/102 |
| 4,091,231 A | 5/1978 | Sotolongo | 174/48 |
| 4,266,266 A | 5/1981 | Sanner | 361/357 |
| 4,323,724 A | 4/1982 | Shine | 174/48 |
| 4,336,416 A | 6/1982 | Goodsell | 174/48 |

(List continued on next page.)

FOREIGN PATENT DOCUMENTS

| | | | |
|---|---|---|---|
| CA | 2 211 066 | 4/1998 | |
| DE | 1 116 385 | 1/1956 | 12/6 |
| DE | 1 105 939 | 5/1961 | 21/22 |
| GB | 836564 | 3/1958 | |

OTHER PUBLICATIONS

Hubbell Brochure entitled "Fire–Rated Poke–Through Flush Series"; dated 1989.
Raceway Components Brochure entitled "Flush Poke–Thru"; dated Oct. 1991.
Hubbell Brochure entitled "Fire–Rated Poke–Through Flush Furniture Feed"; dated 1992.
Raceway Components Brochure entitled "Four On The Floor and More . . . The Flush Poke–Thru Doubles It's Capacity"; dated 1994.
Walker Brochure for RC700 Series Flush Poke–Thru entitled "Place Power and Communication Services Where Needed"; dated 1997.
Walker Brochure entitled "Walker RCI RC900 Series Quad Poke–Thru"; dated 1997.

(List continued on next page.)

*Primary Examiner*—Dean A. Reichard
*Assistant Examiner*—Dhiru R Patel
(74) *Attorney, Agent, or Firm*—McAndrews, Held & Malloy, Ltd.

(57) ABSTRACT

An in-floor, flush poke-through wiring fitting may be installed in the floor of a structure to enable the activation of power, communication, and/or data services at the fitting location. The poke-through fitting internally supports four power receptacles and a plurality of communication/data jacks. The power receptacles may be connected in a single electrical circuit, or may be connected in dual electrical circuits. The poke-through fitting will support data connectors in either a flush mount position or a recessed mounting position. An excess cover includes separate sliding covers for each of the power receptacles and communication/data jacks.

39 Claims, 19 Drawing Sheets

U.S. PATENT DOCUMENTS

| | | | | | |
|---|---|---|---|---|---|
| 4,583,799 | A | | 4/1986 | Wiley | 339/14 |
| 4,770,643 | A | | 9/1988 | Castellani et al. | 439/135 |
| 4,827,080 | A | | 5/1989 | Castellani et al. | 174/48 |
| 4,978,318 | A | | 12/1990 | Wiley et al. | 439/536 |
| 4,993,970 | A | * | 2/1991 | Littrell | 439/535 |
| 5,030,795 | A | | 7/1991 | Domigan | 174/48 |
| 5,124,876 | A | | 6/1992 | Misencik et al. | 361/117 |
| 5,135,411 | A | | 8/1992 | Wiley et al. | 439/535 |
| 5,195,288 | A | * | 3/1993 | Penczak | 174/48 X |
| 5,272,278 | A | * | 12/1993 | Wuertz | 174/48 |
| 5,362,922 | A | * | 11/1994 | Whitehead | 174/48 |
| 5,460,542 | A | | 10/1995 | Castellani et al. | 439/535 |
| 5,467,565 | A | * | 11/1995 | Bowman et al. | 52/220.1 |
| 5,705,772 | A | | 1/1998 | Brown | |
| 5,763,826 | A | | 6/1998 | Castellani et al. | 174/48 |
| 5,814,764 | A | * | 9/1998 | Kohaut | 174/48 |
| 6,114,623 | A | | 9/2000 | Bonilla et al. | |
| 6,018,126 | A | * | 11/2000 | Castellani et al. | 174/48 |
| 6,175,078 | B1 | * | 1/2001 | Bambardekar et al. | 174/48 |
| 6,307,152 | B1 | | 10/2001 | Bonilla et al. | |
| 6,353,180 | B1 | | 3/2002 | DeBartolo, Jr. et al. | |
| 6,417,446 | B1 | | 7/2002 | Whitehead | |
| 6,483,028 | B2 | * | 11/2002 | DeBartolo, Jr. et al. | 174/48 |

OTHER PUBLICATIONS

Walker Brochure for RC2001 Category 5 Flush Poke–Thru entitled "RC2001 Multiple Category 5 Flush Poke–Thru"; dated 1997.

Hubbell Brochure entitled "Fire–Rated Poke–Throughs"; dated 1998.

Walker Brochure entitled "RC3 Series Multiple Service Category 5 and Fiber Optic Flush Poke–Thru"; dated 1998.

Walker Brochure entitled "Flush Floor Box Series Covers For Use With Walker 880 Series Round Floor Boxes"; dated 1998.

Wiremold Brochure entitled "Walker RCI Poke–Thrus"; dated 1999.

* cited by examiner

QUAD RECEPTACLE, DUAL CIRCUIT FLUSH POKE-THROUGH WIRING FITTING WITH INTERNALLY MOUNTABLE COMMUNICATION/DATA JACKS

CROSS-REFERENCE TO RELATED APPLICATIONS

This application claims priority of Provisional Application Ser. No. 60/150,285 filed Aug. 23, 1999.

STATEMENT REGARDING FEDERALLY SPONSORED RESEARCH OR DEVELOPMENT

Not Applicable

BACKGROUND OF THE INVENTION

This invention relates generally to in-floor, flush poke-through wiring or service fittings for enabling activation of power and low-voltage data services (e.g., video, telecommunication, computer network, etc.) at the in-floor locations of the fittings. More particularly, the present invention relates to flush poke-through wiring fittings that provides four outlets with dual circuit capability and which can accommodate a variety of low-voltage service connectors in an internally mounted, protected fashion.

BRIEF SUMMARY OF THE INVENTION

An object of the invention is to provide a flush poke-through fitting which internally supports four electrical receptacles and four communication/data connectors.

A further object of the invention is to provide a flush poke-through fitting in which the electrical receptacles can be connected either in a single circuit, or in electrically isolated circuits.

Still another object of the present invention is to provide a flush poke-through fitting that can accommodate either 15 or 20 amp electrical receptacles.

Yet another object of the present invention is to provide a flush poke-through fitting which can internally support communication/data connectors in either a flush mount or recessed fashion.

Still another object of the present invention is to provide a flush poke-through fitting which shields the data connectors from electromagnetic interference (EMI) and radio frequency interference (RFI).

Still another object of the present invention is to provide a flush poke-through fitting having individual slide covers for each of the electrical receptacles and communication/data connectors.

Yet another object of the present invention is to provide a flush poke-through fitting that can internally support communication/data connectors from a variety of manufacturers.

A further object of the invention is to provide a flush poke-through fitting that has a height adjustable data mounting bracket.

One or more of the above objects and advantages are provided by a flush poke-through wiring fitting that is adapted to be supported in a floor opening in a floor of a building structure, the poke-through fitting includes an insert having an upper end adjacent to the floor and having a chamber defined therein which extends downwardly from the upper end. A fire stopping material disposed in the insert so that the fire rating of the floor, with the floor opening formed in the floor and with the poke-through wiring fitting supported in the floor opening, is substantially the same as the fire rating of the floor without the floor opening formed in the floor. A top assembly is connected with the upper end of the insert. The top assembly overlies the floor opening and has an upper, outwardly facing surface. A first means is provided for internally mounting four communication/data jacks within the fitting in a protected fashion such that the data jacks do not extend upwardly beyond the outwardly facing surface of the top assembly. A second means for internally mounting four power receptacles within the fitting in a protected fashion such that the power receptacles do not extend upwardly beyond the outwardly facing surface of the top assembly.

The first means may include a mounting bracket having a portion that is height adjustable relative to the top assembly such that data jacks of varying heights can be internally mounted in the fitting in a protected fashion.

The poke-through fitting is constructed so that the power receptacles can be wired in single or multiple circuits.

The poke-through fitting includes a cover plate having a body portion and a plurality of communication/data access covers movably connected with the body portion. Each communication/data access cover is associated with a different one of the communication/data jacks and is movable between a first position at which the cover overlies the associated communication/data jack to prevent access thereto and a second position at which the associated communication/data jack is exposed to provide access thereto.

In accordance with one aspect of the invention, four communication/data access covers consist of first and second pairs of communication/data covers. Each pair of access covers is configured such that one of the covers slides under the other cover in a respective pair. To this end, each pair includes an first cover that is slidably connected to the body portion along a first generally horizontal plane and a second cover that is slidably connected to the body portion along a second generally horizontal plane that is different from the first generally horizontal plane.

The cover plate also includes a plurality of second or power receptacle access covers. Each power receptacle access cover is associated with a different one of the power receptacles and is movable between a first position at which the cover overlies the associated power receptacle to prevent access thereto and a second position at which the associated power receptacle is exposed to provide access thereto.

According to another aspect, the poke-through fitting includes a data housing disposed in the upper chamber. The data housing divides the upper chamber into a central portion and a pair of radially outer side portions. A mounting bracket is disposed in the central portion and is adapted to support a plurality of communication/data jacks within the data housing such that the data jacks do not extend upwardly beyond the outwardly facing surface of the top assembly. Power receptacle mounting brackets disposed in each of the outer side portions are adapted to support at least one electrical receptacle within the fitting in a protected fashion such that the power receptacle does not extend upwardly beyond the outwardly facing surface of the top assembly.

According to another aspect of the present invention, two communication/data mounting brackets can be mounted in the central portion. Each of the mounting brackets comprises one of a flush mounting bracket and a recessed mounting bracket. The flush mounting bracket is adapted to support a pair of communication/data jacks in a flush mounted position wherein the bracket is generally aligns with the top of the data housing. The recessed mounting bracket is adapted to support a pair of communication/data jacks in a recessed mounted position such that the bracket is recessed below the top of the data housing by a predetermined amount.

BRIEF DESCRIPTION OF THE SEVERAL VIEWS OF THE DRAWINGS

FIG. 11 is an exploded perspective view illustrating the manner in which communication/data mounting brackets are installed in the poke-through.

DETAILED DESCRIPTION OF THE PREFERRED EMBODIMENT OF THE INVENTION

Figure 1:
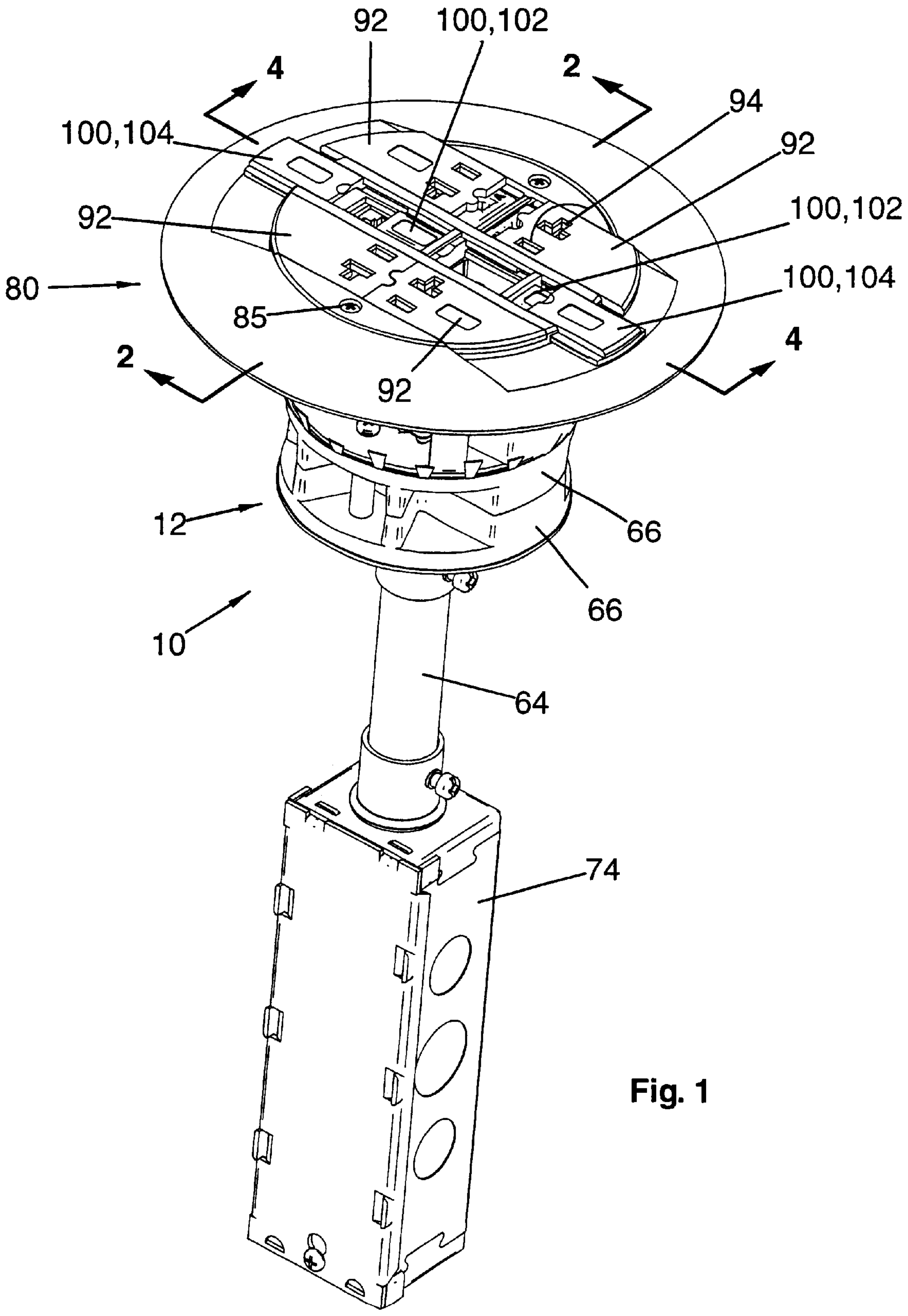
FIG. 1 is a perspective view of a poke-through fitting in accordance with the present invention.

Referring to the drawings a flush poke-through fitting 10 in accordance with the present invention will be described. The poke-through fitting includes many components that are the same as or similar to components described U.S. patent application Ser. No. 09/201,492 (the "'492 application) which was filed on Nov. 30, 1998 and is entitled "Improved Poke-through Wiring Fitting Having A Height Adjustable Data Jack Mounting Bracket" and application Ser. No. 09/098,797, which was filed on Jun. 17, 1998, issued as U.S. Pat. No. 6,018,126 (the "'126 patent"), and is entitled "Flush Poke-through Wire Fitting". The disclosures of the '492 application and the '126 patent are hereby incorporated in their entirety by reference.

The poke-through fitting 10 is adapted to be installed in a fire-rated floor A of a building, such as a commercial office building. More specifically, the poke-through fitting 10 may be installed in a circular opening B formed in floor A to activate a desired floor location. It is adapted to be activated by connecting source power service and source signal service cables, which are otherwise disposed in the plenum C below the floor A, to fittings such as power receptacles and data jacks, respectively, mounted internally in the poke-through fitting 10. This enables above-floor A power plugs and signal transferring devices to be connected the poke-through fitting 10 and to thus transfer power and communication/data signals to equipment located on or above the floor A.

Figure 2:
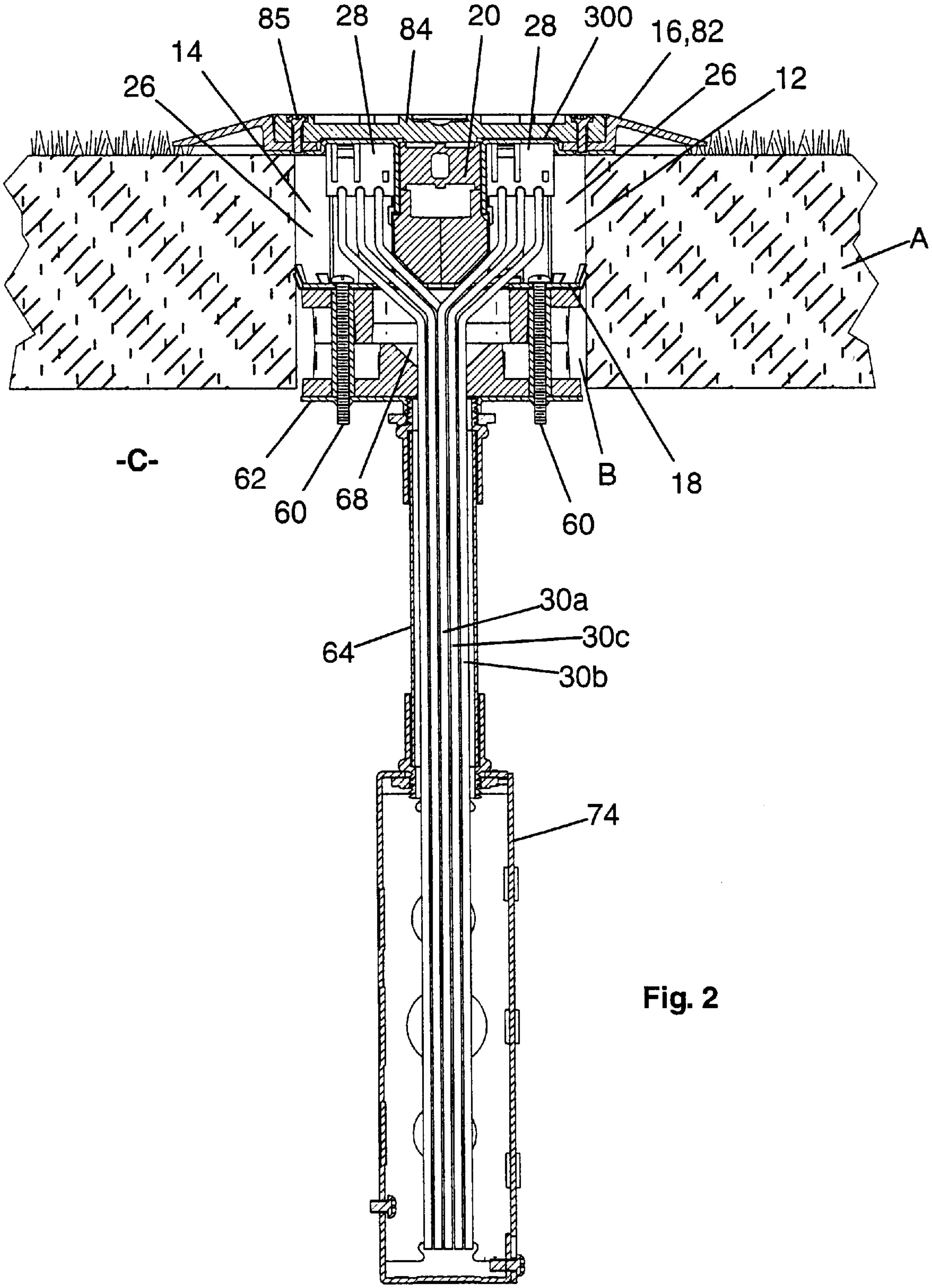
FIG. 2 is a cross sectional view along line 2—2 of FIG. 1.

The poke-through fitting 10 comprises an insert 12 that is adapted to be installed in a floor opening B. Insert 12 includes an upper, generally cylindrical chamber 14, which is generally defined at the insert's upper end by a horizontally disposed top plate 16 and at its lower end by a horizontally disposed middle plate 18. (In the illustrated embodiment, the top plate 16 is generally defined by the finishing ring 82 and power receptacle support plates 300). A data housing 20 divides the upper chamber 14 into a central space or portion 24 in which the communication/data connectors 32 are disposed, and pair of radially outer, semi-annular side spaces or portions 26 in which the power receptacles 28 are disposed. In this respect, the fitting 10 includes four power receptacles 28 that are adapted to be activated within the fitting 10 by high-voltage power cables 30 within the housing. The power receptacles 28 may be wired in a single circuit or may be wired in a two electrically isolated circuits. In the illustrated embodiment, the receptacles 28 are wired in two electrically isolated circuits. Specifically, the two receptacles in the left side space (in FIG. 2) are wired in one circuit, while the receptacles in the right side space are wired in a second circuit. The fitting 10 also internally supports a plurality (four in the illustrated embodiment) of low-voltage service connectors or jacks 32 that are adapted to be activated within the fitting 10 by low-voltage source signal service cables 34. These jacks 32 are generally referred to herein as communication/data jacks. Terminals in the upper faces of the communication/data jacks 32 are accessible through sliders in the cover plate 84. In the illustrated embodiment, the fitting 10 includes two RJ-45 category 5 jacks 36 and two fiber optic jacks 38. (See FIG. 4). Terminals in the lower ends of the jacks 32 are positioned in the data housing 20 where they are interconnected with the cables 34.

Figure 5:
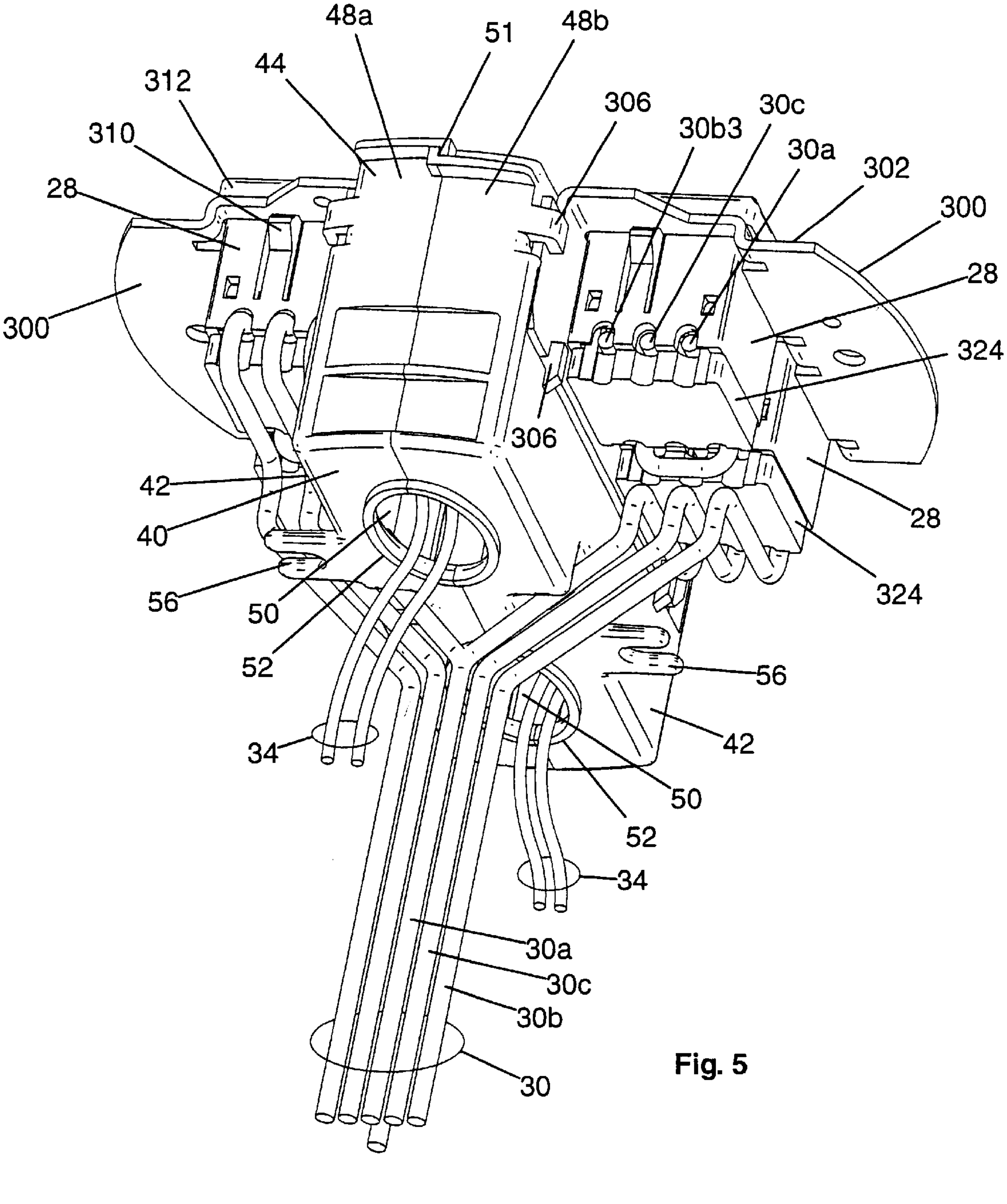
FIG. 5 is a partial bottom perspective view of a portion of the poke-through fitting of FIG. 1, with the two-piece metal jacket removed from the data housing.
Figure 6:
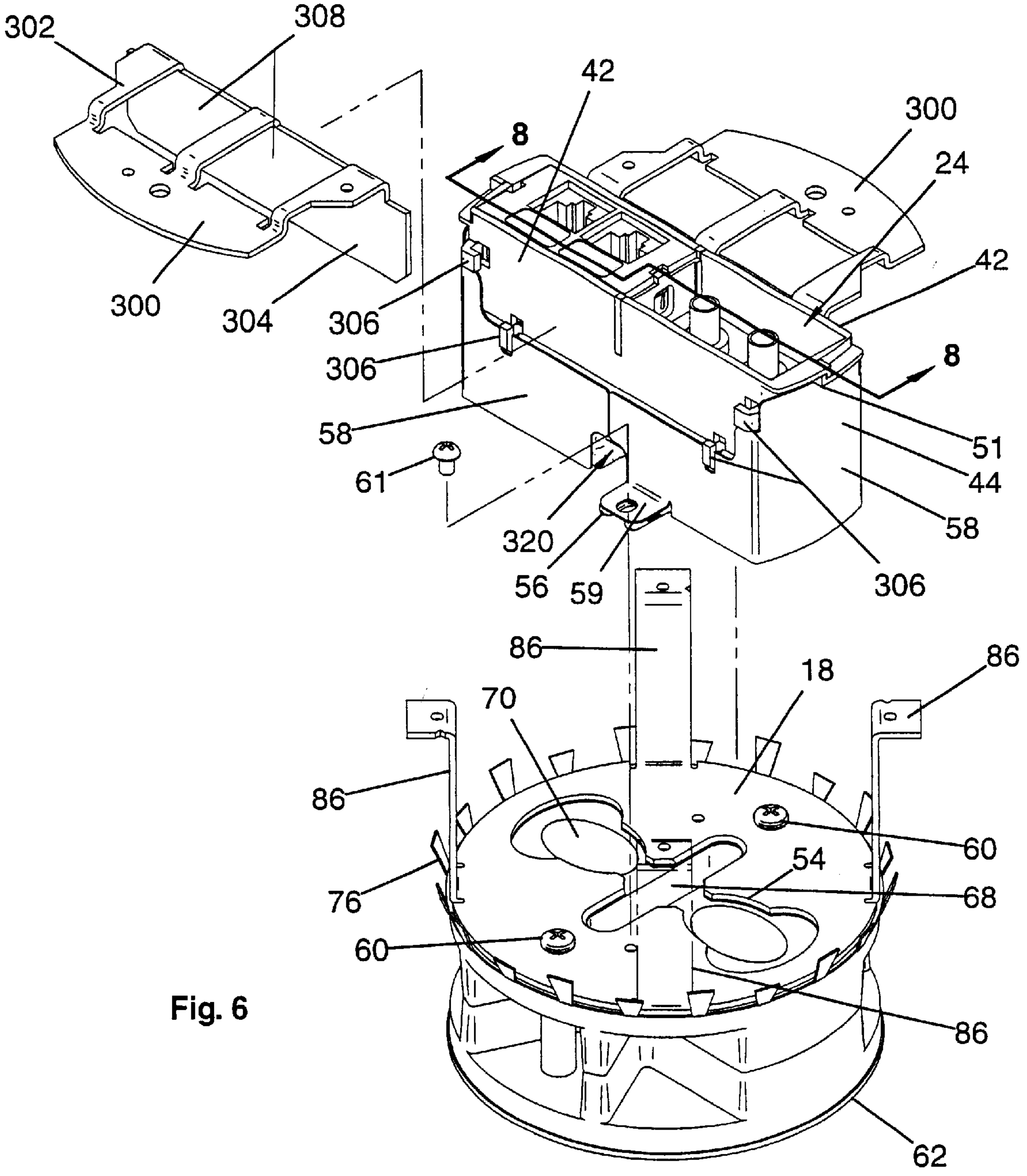
FIG. 6 is a partial exploded perspective view showing the manner in which the data housing is installed to the poke-through fitting of FIG. 1.
Figure 7:
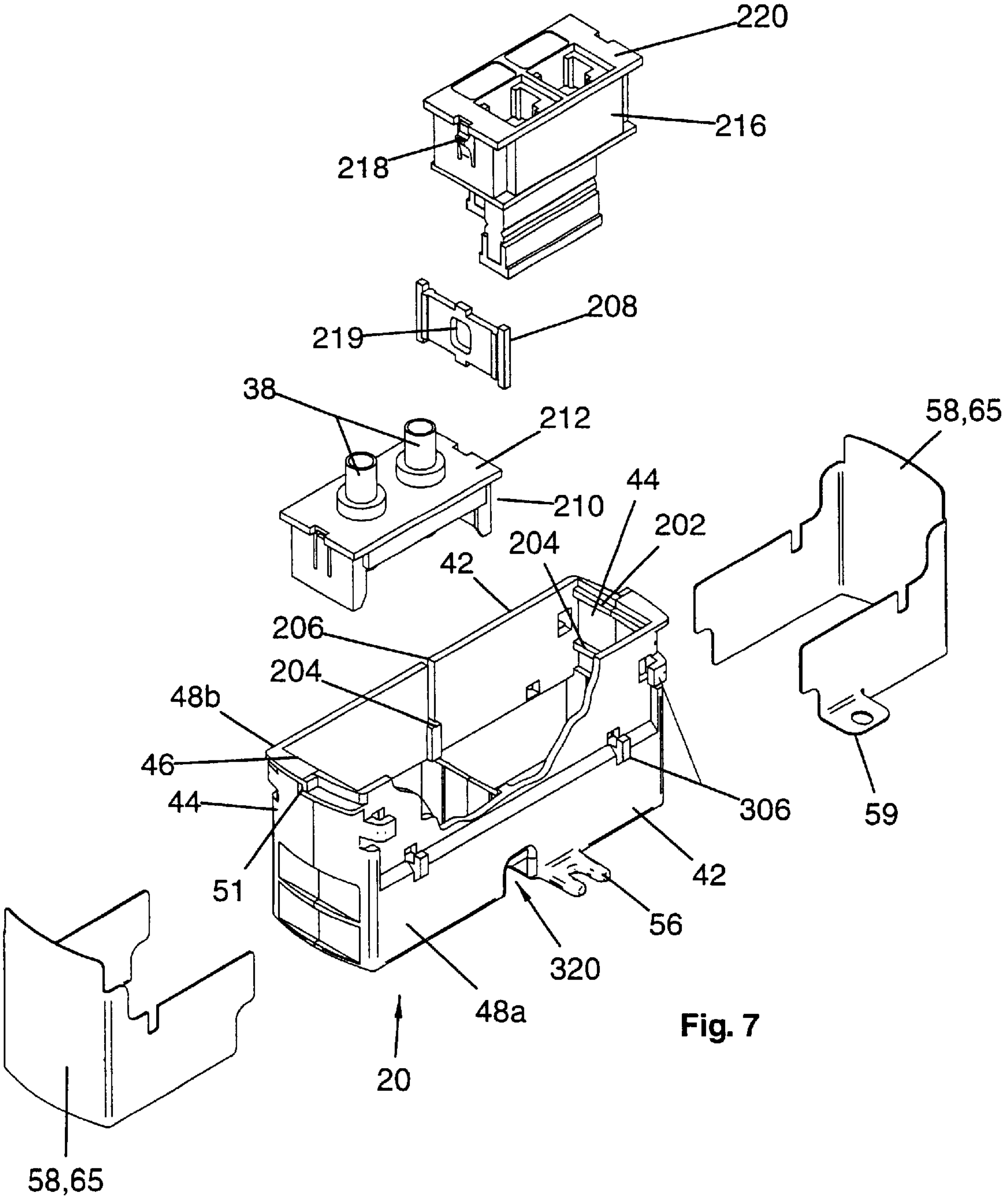
FIG. 7 is a partial exploded perspective view, showing details of a data housing employed in the poke-through fitting of FIG. 1.
Figure 8B:
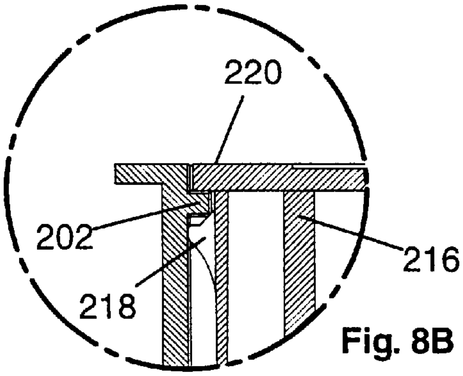
FIG. 8B is an enlarged portion of FIG. 8A encircled by the broken line.
Figure 8A:
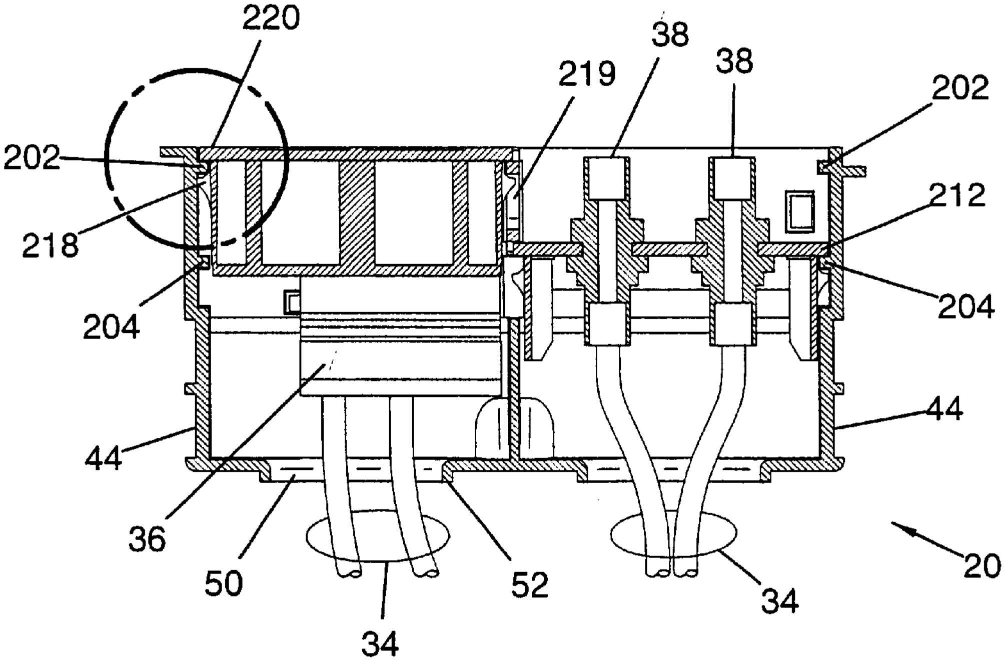
FIG. 8A is a partial cross section view along line 8—8 of FIG. 6, with the two-piece metal jacket removed from the data housing.

The data housing 20 physically separates and electrically isolates the connection between the power receptacles 28 and the source power service cables 30 from the connection between the communication/data jacks 32 and the source signal service cables 34 so as to shield the source signal service cables, and their associated jacks 32, from E.M.I. and/or R.F.I. emanating from the source power service cables 30. As can be seen in FIGS. 5–7, the data housing 20 is generally rectangular and includes a bottom wall 40, a pair of opposed side walls 42, a pair of opposed end walls 44, and a top opening 46 which define the central space 24. The side walls 42 extend across the chamber like chords and serve to divide the central space 24 from the side spaces 26. The data housing 20 shields the central space 24, where the low-voltage services cables 34 are connected to the communication/data jacks 32, from the radially outer spaces 26, where the high-voltage power cables 30 are connected to the power receptacles 28. The data housing 20 is preferably made from two interlocking half-sections 48*a*, 48*b*. Interlocking fingers 51 formed on the top edges of the end walls 44 help secure the sections 48*a*, 48*b* together. (See FIG. 7) Openings 50 are formed in the bottom wall 40 for routing communication/data cables 34 into the central space 24. Flanges 52 extend from the bottom wall around the openings 50. The flange 52 engage in reciprocal openings 54 (see FIG. 6) in the middle plate 18 to further secure the housing sections 48*a*, 48*b* together.

Figure 3:
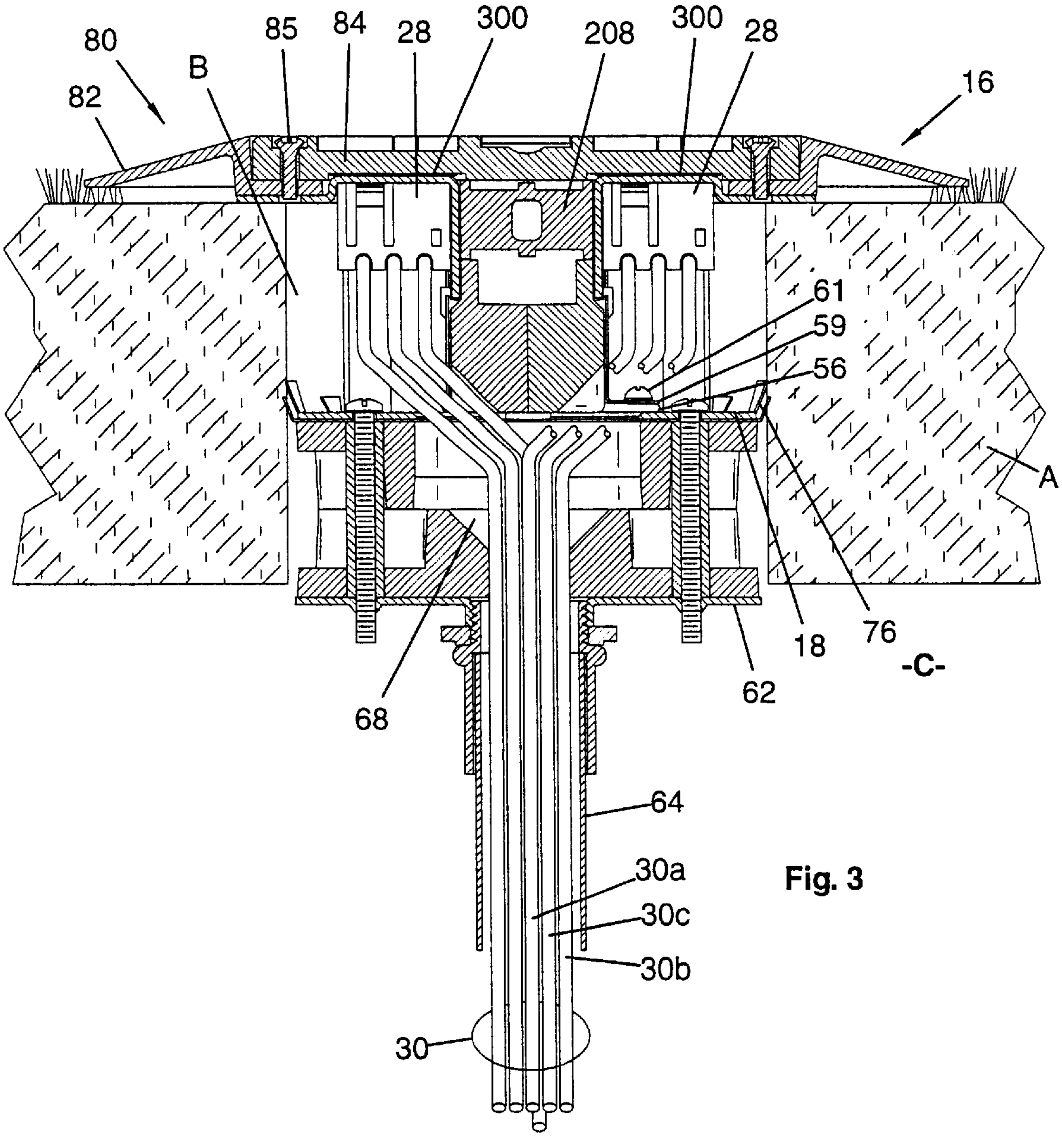
FIG. 3 is a enlarged partial view of FIG. 2.

The data housing 20 is comprised of a dielectric material such as polyvinyl chloride. As is shown generally in FIG. 6, an E.M.I/R.F.I. shield 58 is disposed about the data housing 20. (It should be noted that, for illustration purposes, the shield 58 has not been shown in FIGS. 3 and 5). In the illustrated embodiment, the shield 58 is in the form of a two-piece metal jacket 65 which is configured to snap around the exterior of the data housing 20. (See FIG. 7). In addition to shielding the data jacks from electromagnetic and radio frequency interference, the metal jacket 65 ensures compliance with local building codes that preclude exposed plastic housings. The metal jacket 65 also helps secure the housing sections 48*a*, 48*b* together. In some applications it may be economically desirable to replace the metal jacket with a foil collector, as is described in the '492 application and the '126 patent.

Mounting flanges 56 extend from the bottom edges of the side walls 42. The metal jacket has flanges 59 that align with the mounting flanges 56. Metallic fasteners 61, such as screws, extend through apertures in the flanges 56, 59 and thread into reciprocal apertures in the middle plate to secure the data housing 20 to the plate 18. (See FIGS. 3 and 6. Note that in FIG. 3, the conductors have been shown in broken line so that the connection between the housing 20 and plate 18 can be seen). This connection also serves to ground the shield 58 to drain E.M.I. and R.F.I which is generated in the chamber 14. Specifically, the shield 58 is grounded through the fasteners 61 to the middle plate 18, and in turn through a metallic fastener 60, such as a rivet or bolt, to a horizontally disposed bottom plate 62 which is in turn grounded through conventional electrical metalized tubing (EMT) 64. It should be noted that a single set of fasteners could be used to secure the entire assembly together.

Insert 12 further includes two fire stopping elements 66, comprised intumescent material such as hydrated sodium silicate. The elements 66 form an insulating barrier to control temperature increases and retard the spread of flames. The elements 66 further protect against heat and flame by forming a refractory char as the temperature continues to rise. The details of the intumescent material and more fully described in the aforementioned '492 application and the '126 patent.

The fire stopping elements 66 each include a central, hollow passage 68 (see FIG. 3) that defines and forms a central raceway through which the source power service cables 30 are extendable. The elements 66 similarly include two side hollow passages 70 that define two side raceways through which the communication/data signal service cables 34 are extendable. (See FIG. 4)

The fire stopping elements 66 are supported between the middle plate 18 and the bottom plate 62. The middle and bottom plates 18, 62 have openings which are aligned with the passages 68, 70 in the elements 66 to permit wires to pass between the plenum C and the upper chamber 14.

The upper end of the electrical metalized tubing 64 is connected to the bottom plate 62 for securing a conduit system thereto and for improving grounding capability. A conventional junction box 74 may be connected to the lower end of the tube 64.

Insert 12 also includes a conventional annular retainer 76 which is disposed adjacent the middle plate 18. The retainer 76 retains the pokethrough fitting 10 in floor opening B. The fasteners 60 extend between and are connected between the plates 18 and 62 for assisting in securing the fire stopping elements 66 between the plates, and as noted above, to facilitate grounding of the barrier EMI/RFI collector 58.

Figure 10:
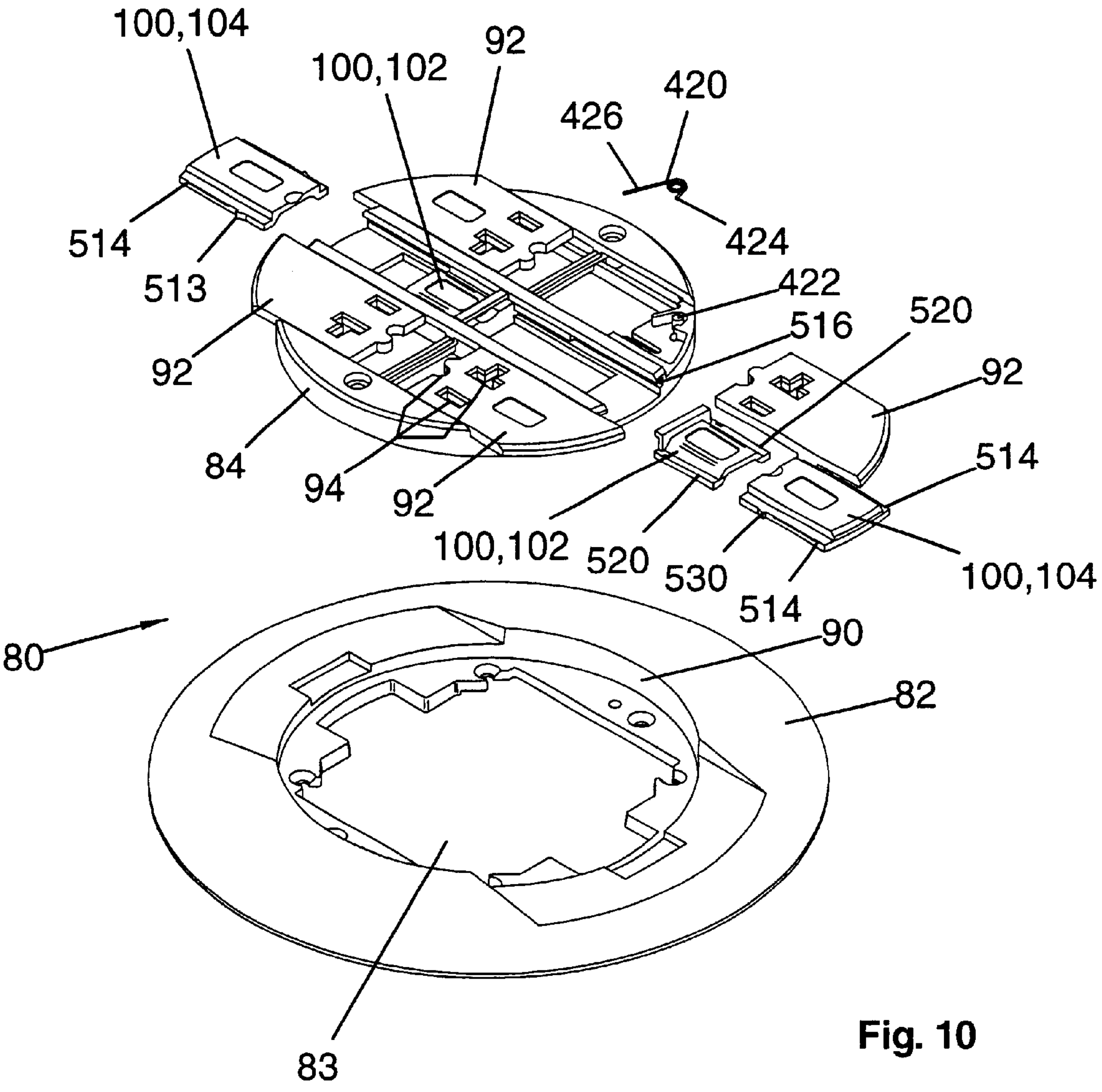
FIG. 10 is an exploded view of a top assembly employed in the poke-through fitting FIG. 1.
Figure 11:
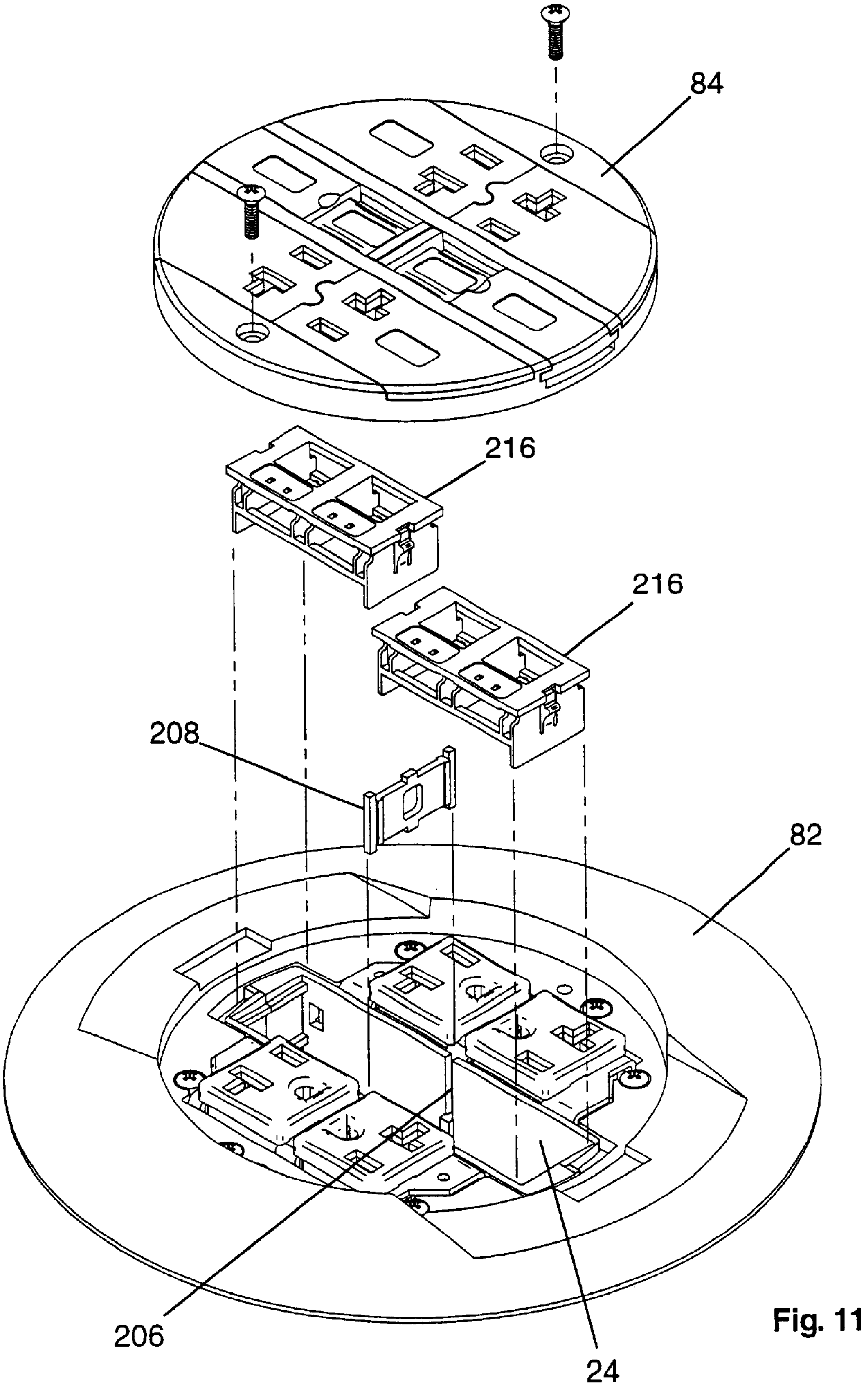

Referring additionally to FIG. 10, the poke-through fitting 10 further includes a top assembly 80 which is connected with the upper end of the insert and which overlies the floor opening B. The top assembly 80 includes a carpet flange or finish ring 82 and a cover plate 84. The finishing ring 82 is secured to the insert 12 by fasteners (now shown) that extend through the finishing ring 82 and thread into reciprocal openings in legs 86 (see FIG. 6) that extend upwardly from the middle plate 18. (Note that in FIG. 6 the front leg 86 is drawn in broken line so that the top of plate 18 can be seen more clearly). The finishing ring 82 has a central opening 83 that overlies the upper chamber 14 of the insert to provide access therefor.

The cover plate 84 is generally circular and is sized to fit in a generally annular recess 90 formed in the top of the finish ring 82 around the central opening 83. Threaded fasteners 85 secure the cover plate 84 to the finish ring 82. (See, e.g. FIG. 2). The cover plate 84 includes four power covers 92 that are positioned to overlay the side spaces 26 and hence the power receptacles 28. Slots 94 in the covers 92 are alignable with corresponding blade receiving slots in the power receptacle 28. In use, the covers 92 may be moved outwardly so that outlet slots 94 in the covers 92 align with corresponding slots in the power receptacle 28, to permit an electrical plug (not shown) to be connected to the receptacle 28 for activation of above floor A power services.

The cover plate 84 also has four communication/data jack covers or sliders 100 that are positioned to overlay the central space 24 of the chamber 14. The covers 100 are slidably movable between positions covering and uncovering the associated communication/data jacks 32. The communication/data covers 100 are constructed such that any of the communication/data jacks are covered (protected) when they are not in use. In particular, the covers 100 include a pair of lower, inner covers 102 and a pair of upper, outer covers 104. The lower covers 102 are slidably mounted in lower grooves formed in the cover plate 84, whereas the upper covers 104 are mounted in upper grooves in the cover plate. Each covers 102, 104 can be moved outwardly to expose the underlying communication/data jack independently of the other sliders 102, 104.

Referring to FIGS. 4–8 and 11–14, the manner in which the communication/data jacks 32 are mounted within the insert 10 will be described in greater detail. The data housing 20 is configured to support communication/data jacks at either a flush mount position (left half of FIG. 8A) or recessed position (right half of FIG. 8A). For this purpose, the data housing 20 includes an upper ribs or flanges 202 formed on the inside of each of the end walls 44 and lower ribs or flanges 204 formed on the end walls and the side walls. In the illustrated embodiment, the lower flanges 204 on the side walls align generally with vertical slots 206 in the side walls. The data housing 20 further includes a vertical divider 208 that slidably engages in the vertical slots 206.

A recessed mounting bracket 210 is provided for mounting a pair of communication/data connectors, such as co-axial connectors, in a recessed fashion. The top wall 212 of the bracket 210 overlies and is supported by the lower flanges 204. In use, the recessed mounting bracket 210 is installed prior to the vertical divider 208.

A flush mounting bracket 216 is provided for mounting a pair of communication/data jacks, such as RJ-45 Category 5 jacks, in a flush mount fashion. The flush mount bracket 216 is adapted to be supported in the housing at its outer end by the upper flange 202 and at its inner end by the top edge of the central divider 208. Locking tabs 218 are provided for locking the mounting bracket into the housing. As the flush mount bracket 216 is slid into the data housing, the locking tabs 218 are biased inwardly by the top flange 202 and the divider 208. Once the outer locking tab 218 moves downwardly beyond the top flange 202 it snaps outwardly to secure the upper flange between the tab 218 and the top wall 220 of the bracket. Similarly, the inner locking tab is configured to snap into a reciprocal opening 219 or slot formed in the vertical divider 208. Once installed, the top wall 220 of the flush mount bracket 216 is generally flush with the top wall of the data housing 20.

Figure 12:
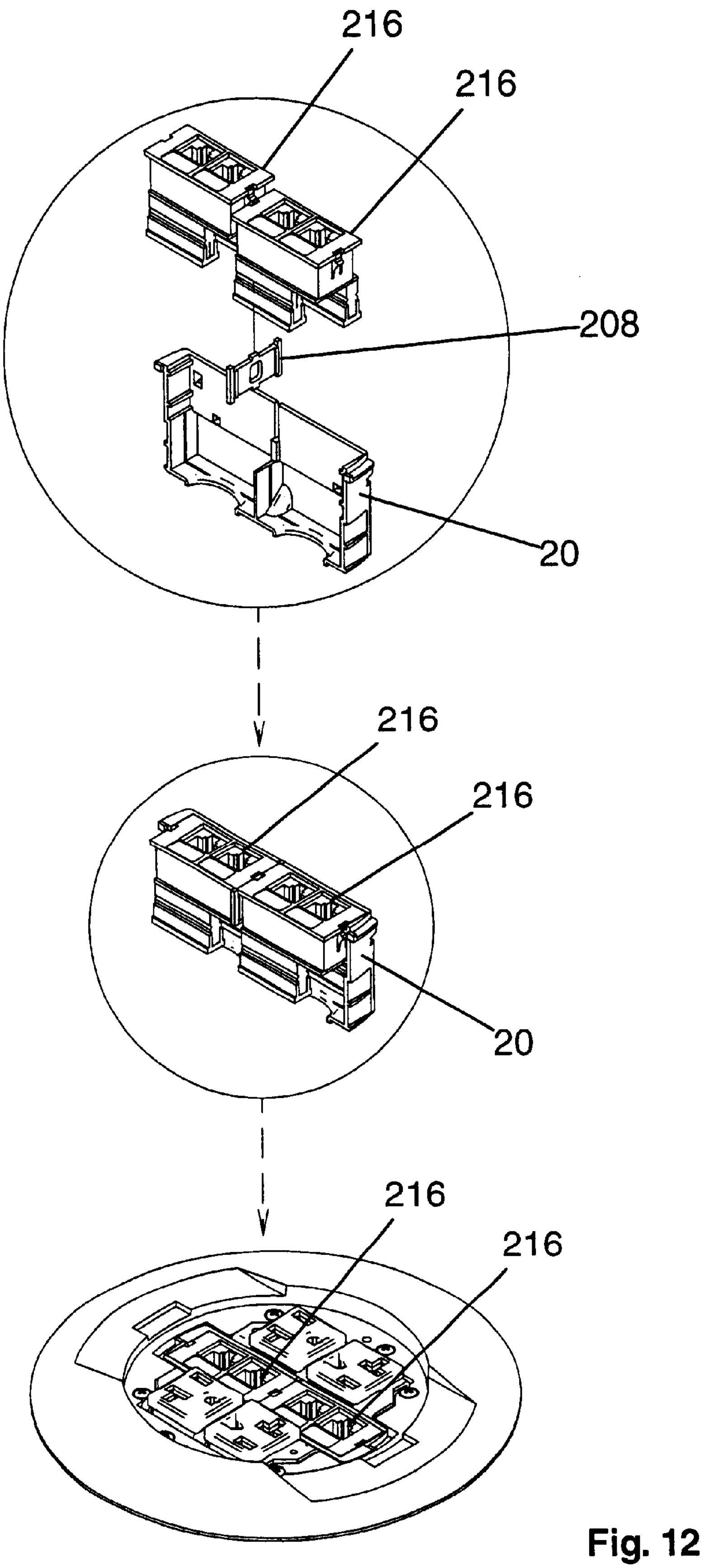
FIG. 12 illustrates the manner in which where a pair of flush mount communication/data mounting brackets are installed in the data housings.
Figure 13:
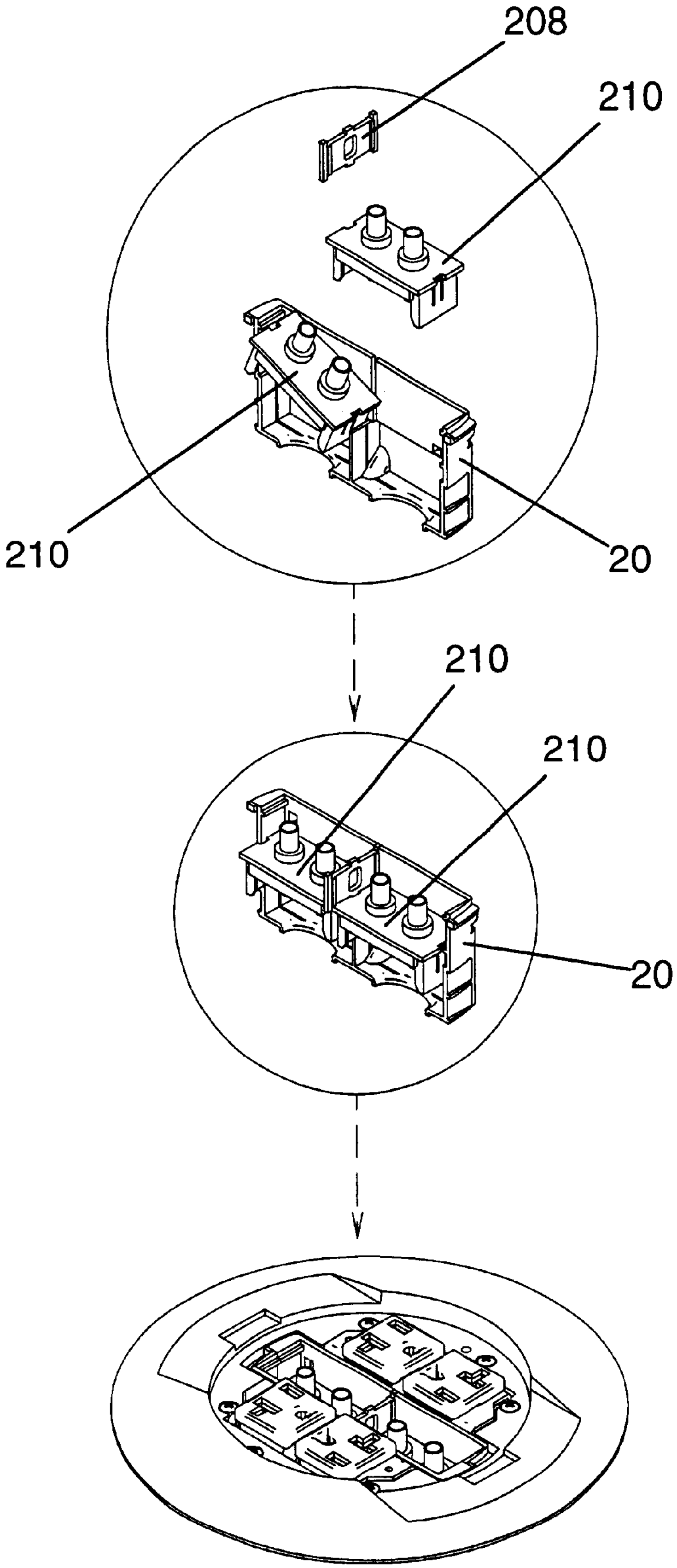
FIG. 13 illustrates the manner in which a pair of recessed communication/data mounting brackets are mounted in the data housing.
Figure 14:
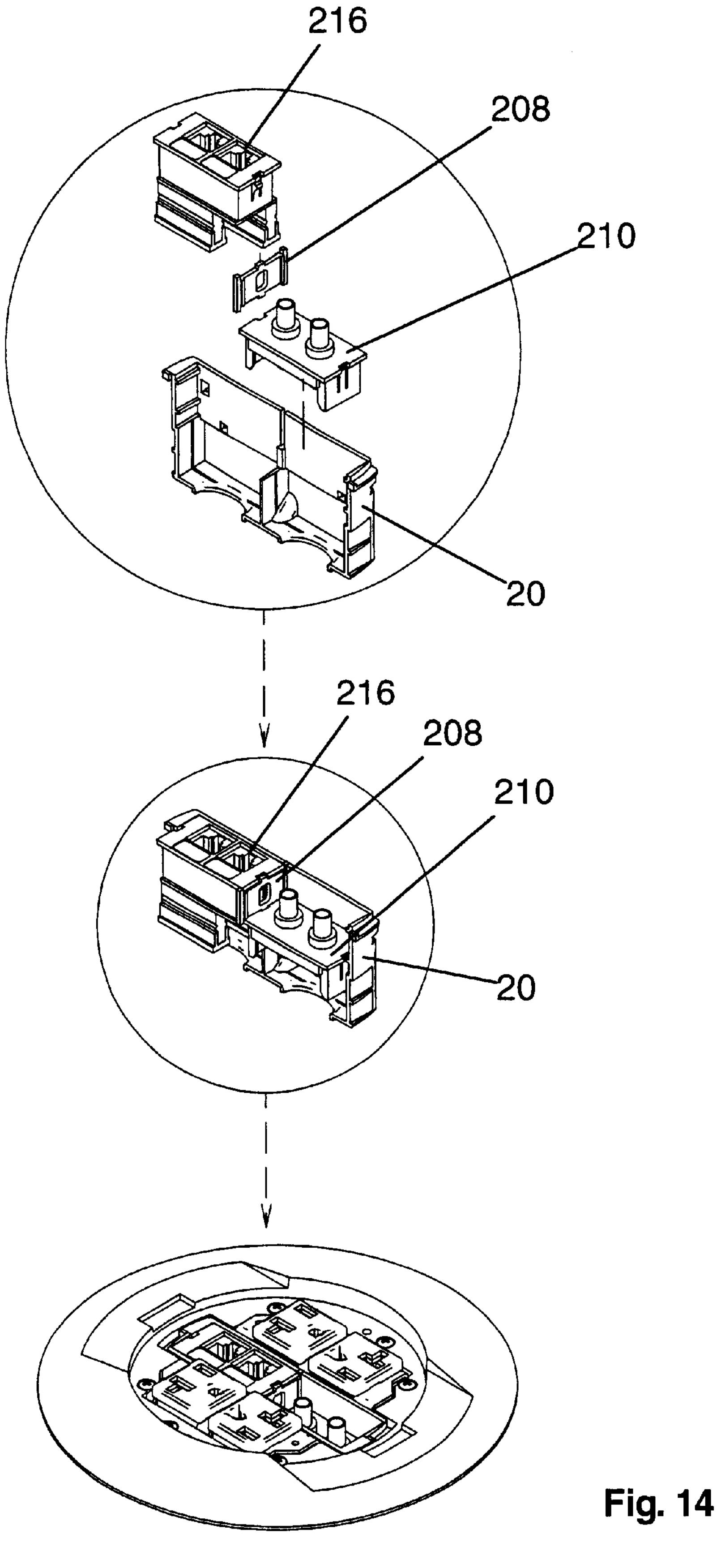
FIG. 14 illustrates the manner in which a flush and a recessed communication/data mounting bracket are mounted in the data housing.
Figure 15:
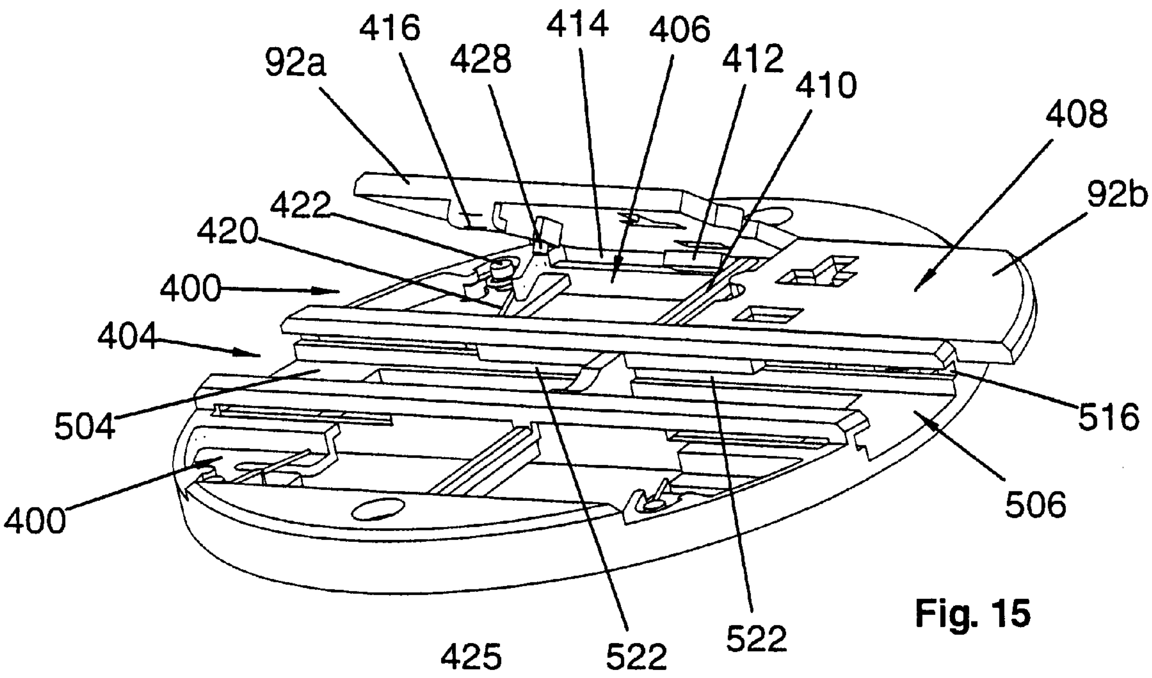
FIG. 15 is a perspective view illustrating the manner in which the power sliders are mounted in the cover plate of the poke-through fitting of FIG. 1.
Figure 16:
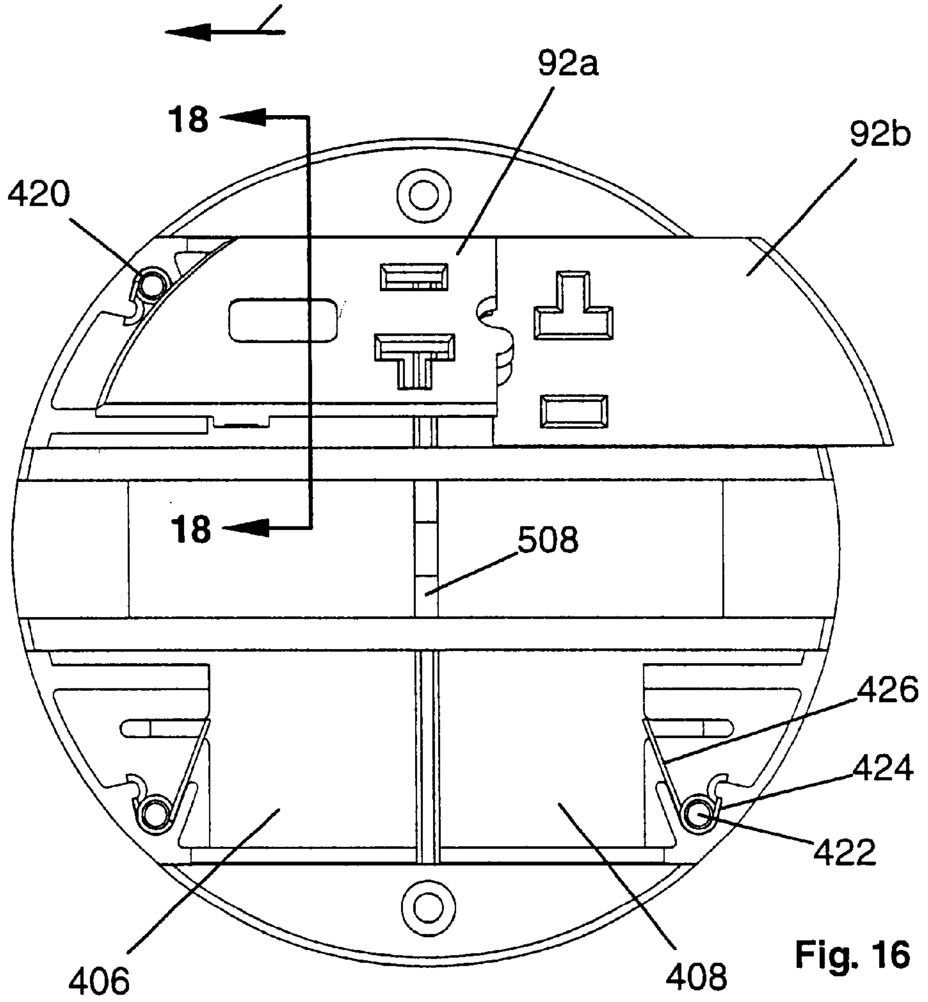
FIG. 16 is a top view of FIG. 15.
Figure 17:
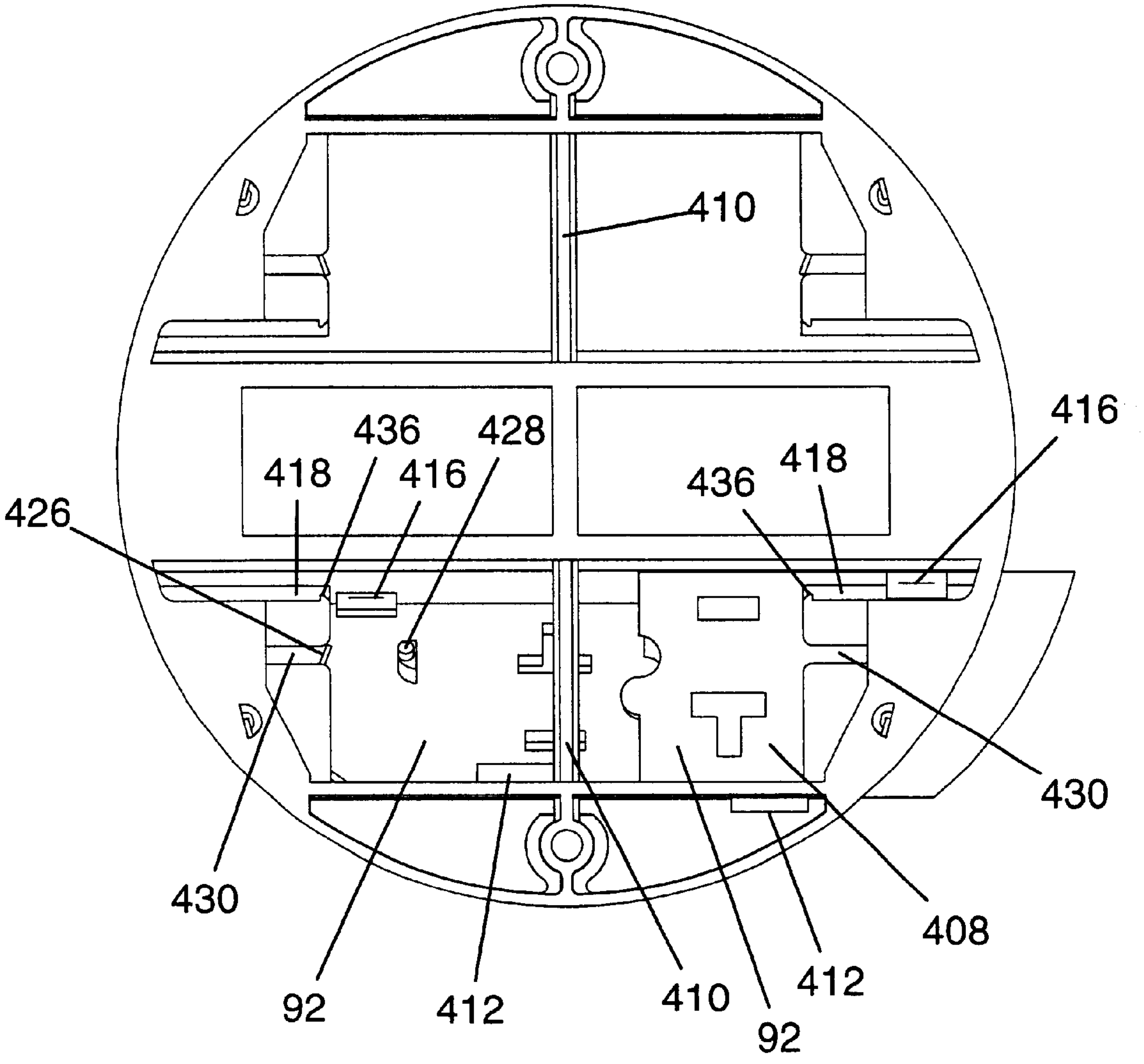
FIG. 17 is a bottom view of FIG. 15.
Figure 18:
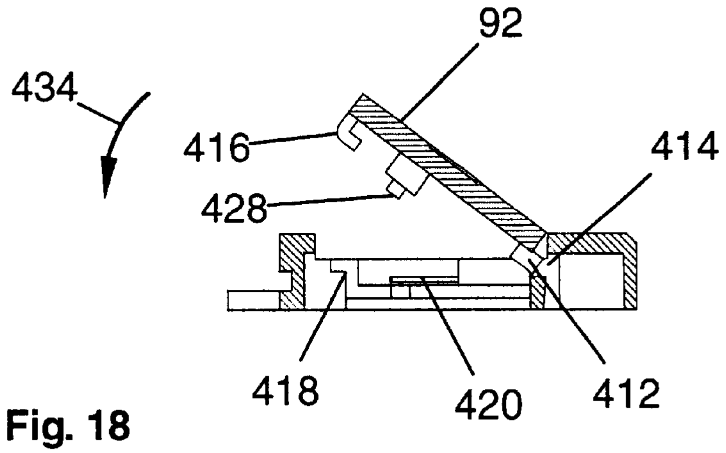
FIG. 18 is a section view along line 18—18 of FIG. 16.
Figure 19:
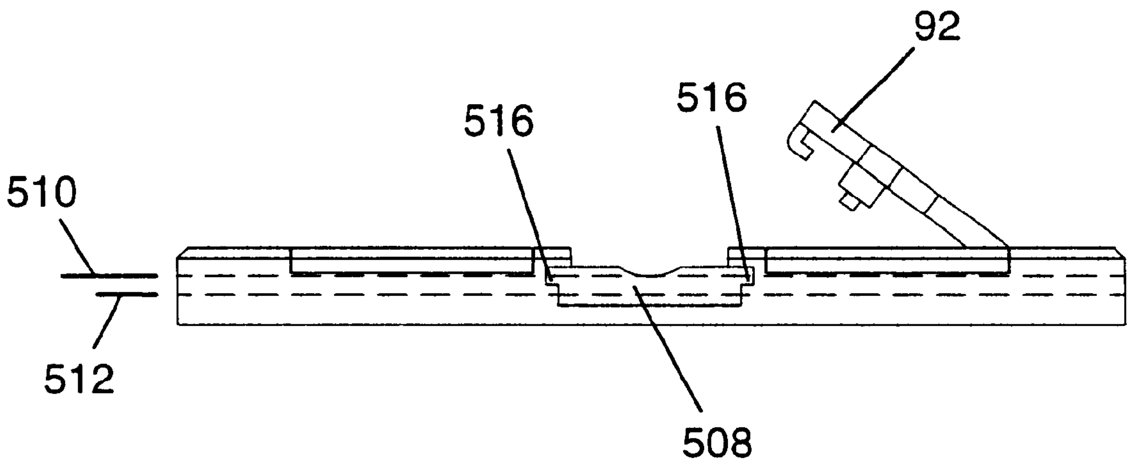
FIG. 19 is an end view of FIG. 15.
Figure 20A:
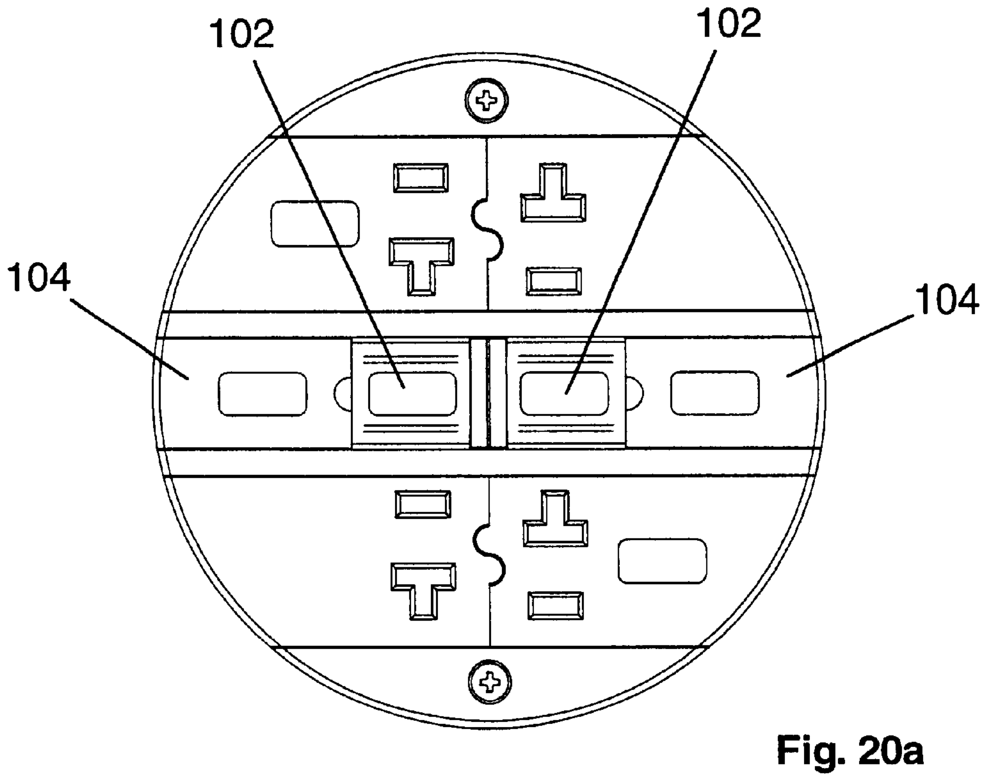
FIGS. 20*a*–20*d* illustrate operation of the communication/data covers.
Figure 20B:
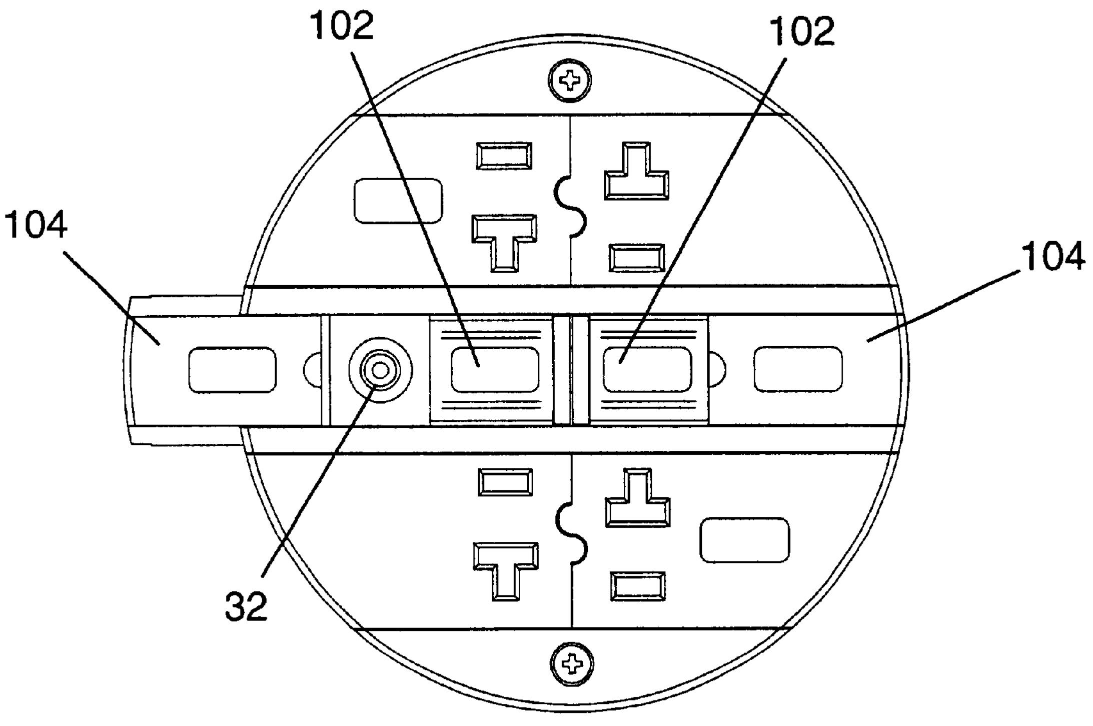
Figure 20C:
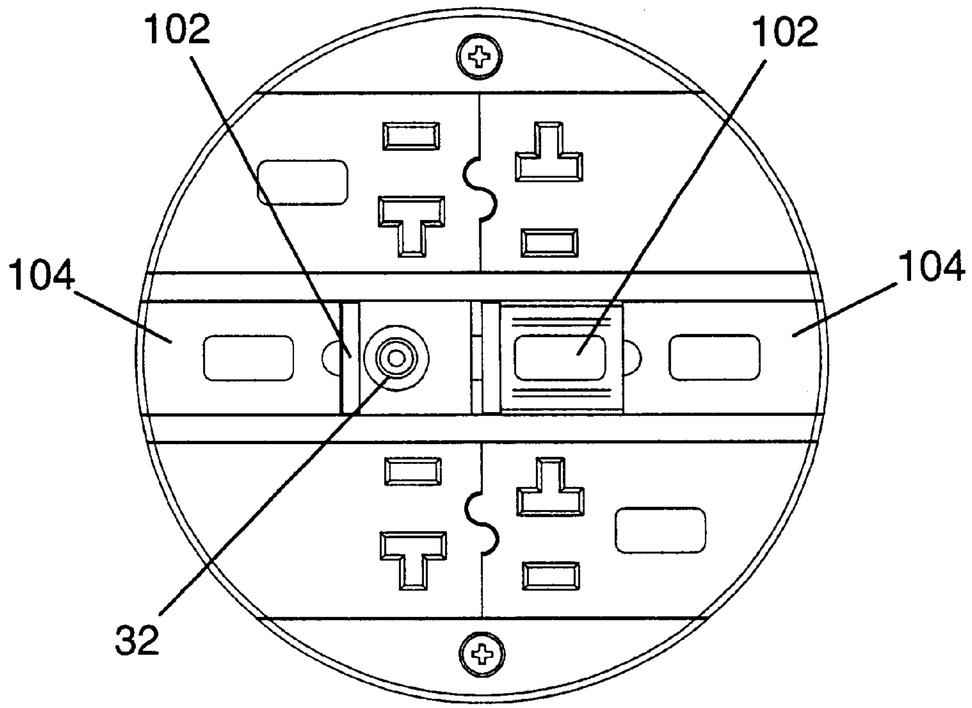
Figure 20D:
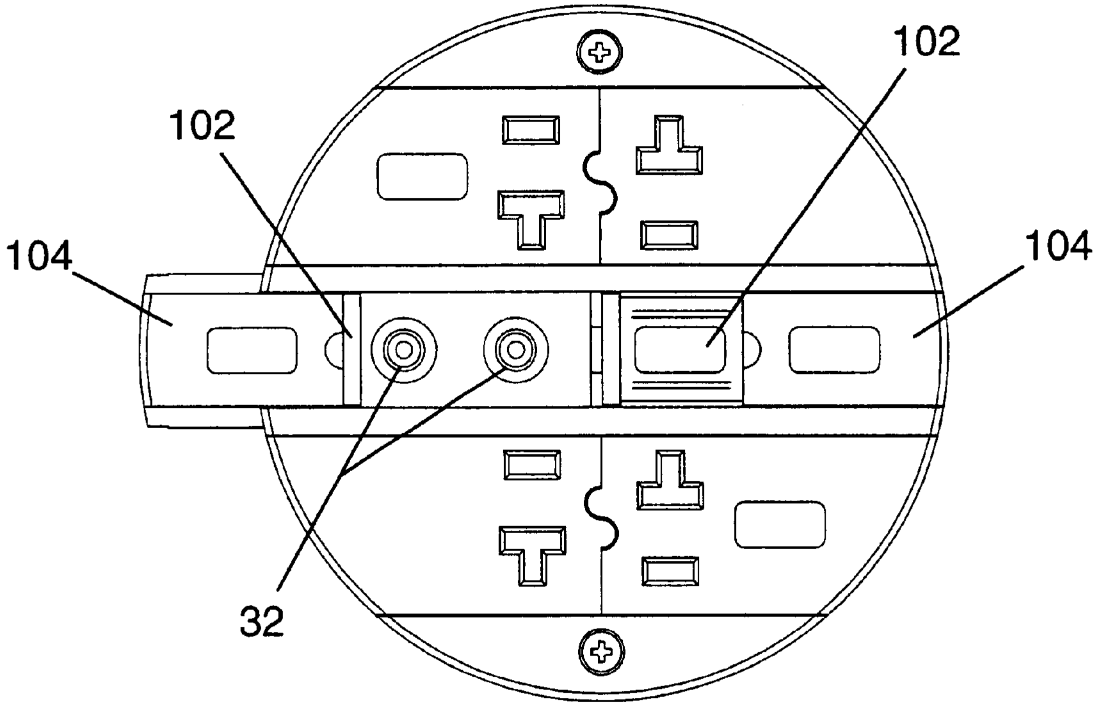

Depending on the application, any combination of the mounting brackets 210, 216 may be used. For example, in many instances it will be desirable to use both a flush mount bracket and a recessed bracket. (See FIGS. 8, 14) However, in some instances, it may be desirable to use two of the flush mount brackets (see FIG. 12) or, alternatively, two of the recess mount brackets (see FIG. 13). It should be appreciated that, for clarity, only one half of the data housing is shown in FIGS. 12–14. It should also be appreciated that the data housing 20 cannot be removed from the fitting, as is shown in the upper drawings in FIGS. 12–14. These views are provided for better illustrating how the brackets fit into the housing 20. In practice, the mounting brackets are designed to be installed into the fully assembled poke-through fitting either just prior to is insertion into the floor or after it has been installed in the floor.

With reference to FIG. 12, when two flush mount brackets 216 are installed the divider 208 is initially inserted in the slot 206. Thereafter, one of the flush mount brackets 216 (with the data jacks installed and wired) is inserted into the housing 20. After the first flush mount bracket 216 is installed, the other flush mount bracket is installed in the same manner. By contrast, when two recessed brackets are installed (as shown in FIG. 13), both of the recessed brackets 210 are installed in the housing 20 before the divider 208 is inserted in the slots 206. When both a recessed bracket 210 and a flush mount bracket 216 are installed (as shown in FIG. 14) the recessed bracket 210 is initially installed in the housing 220. Thereafter, the divider 208 is inserted into the slots 206, after which the flush mount bracket is inserted into the housing 20.

Figure 4:
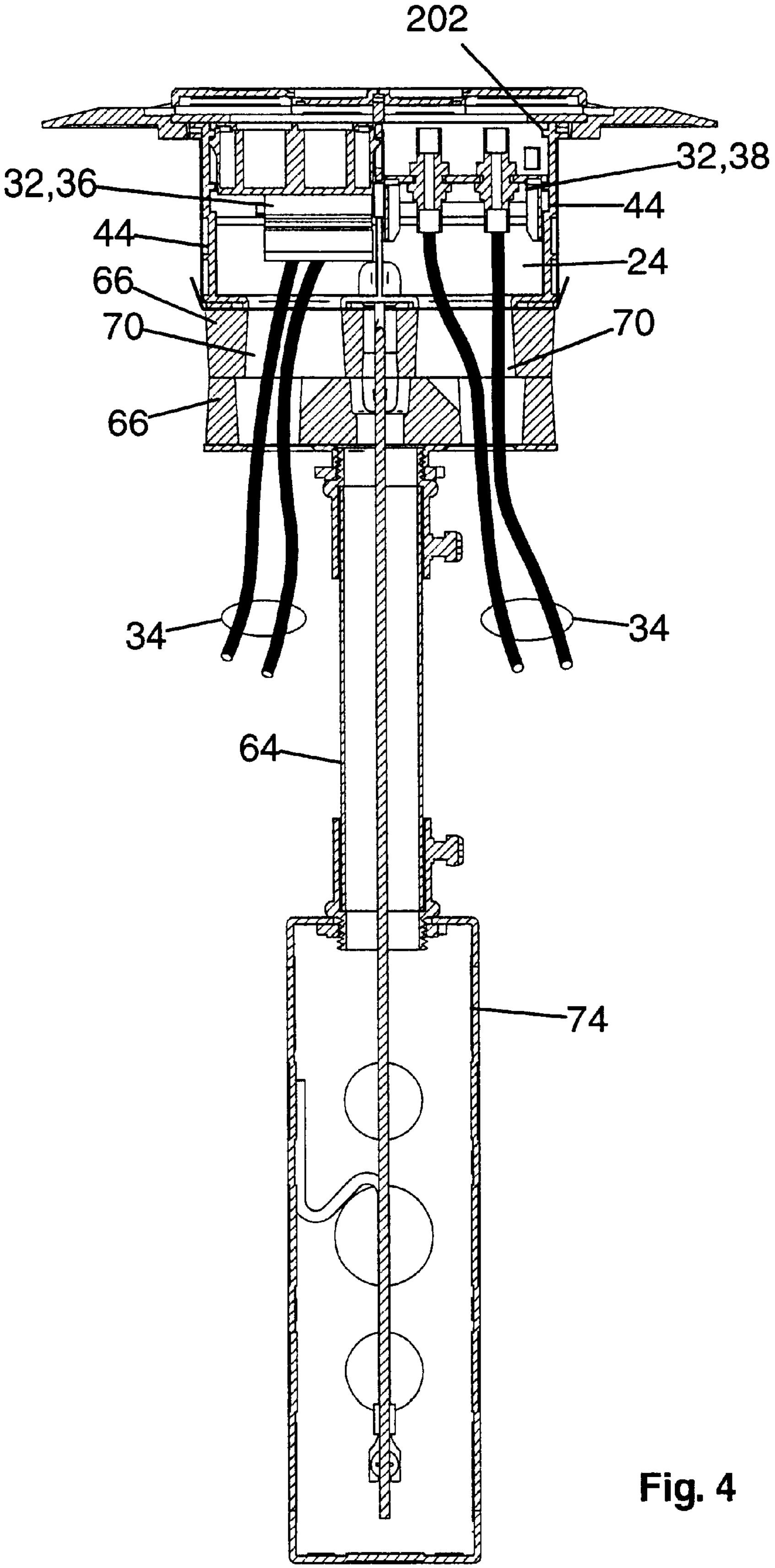
FIG. 4 is a cross sectional view along line 4—4 of FIG. 1, showing an optimal communications adapter.

The flush mounting bracket 216 is generally similar to the bracket second portion 202A shown in FIG. 4 and described in detail on pages 13 to 16 of the '492 application. As is noted in the '492 application, this component is commercially available from Interlink division of the Wiremold Company as a model 2A–U2 KEY connector, and is constructed to support a pair of Keystone data jacks that are also commercially available from Interlink. Similarly, the recess mounting bracket generally corresponds to the bracket second portion 202B which is shown in FIG. 5 and described in detail on pages 16 to 17 of the '492 application. It will be appreciated that other mounting brackets may readily be used to support communication/data connectors of differing constructions. Moreover, a single mounting bracket could be provided for supporting four communication/data receptacles within the housing 20.

Figure 9:
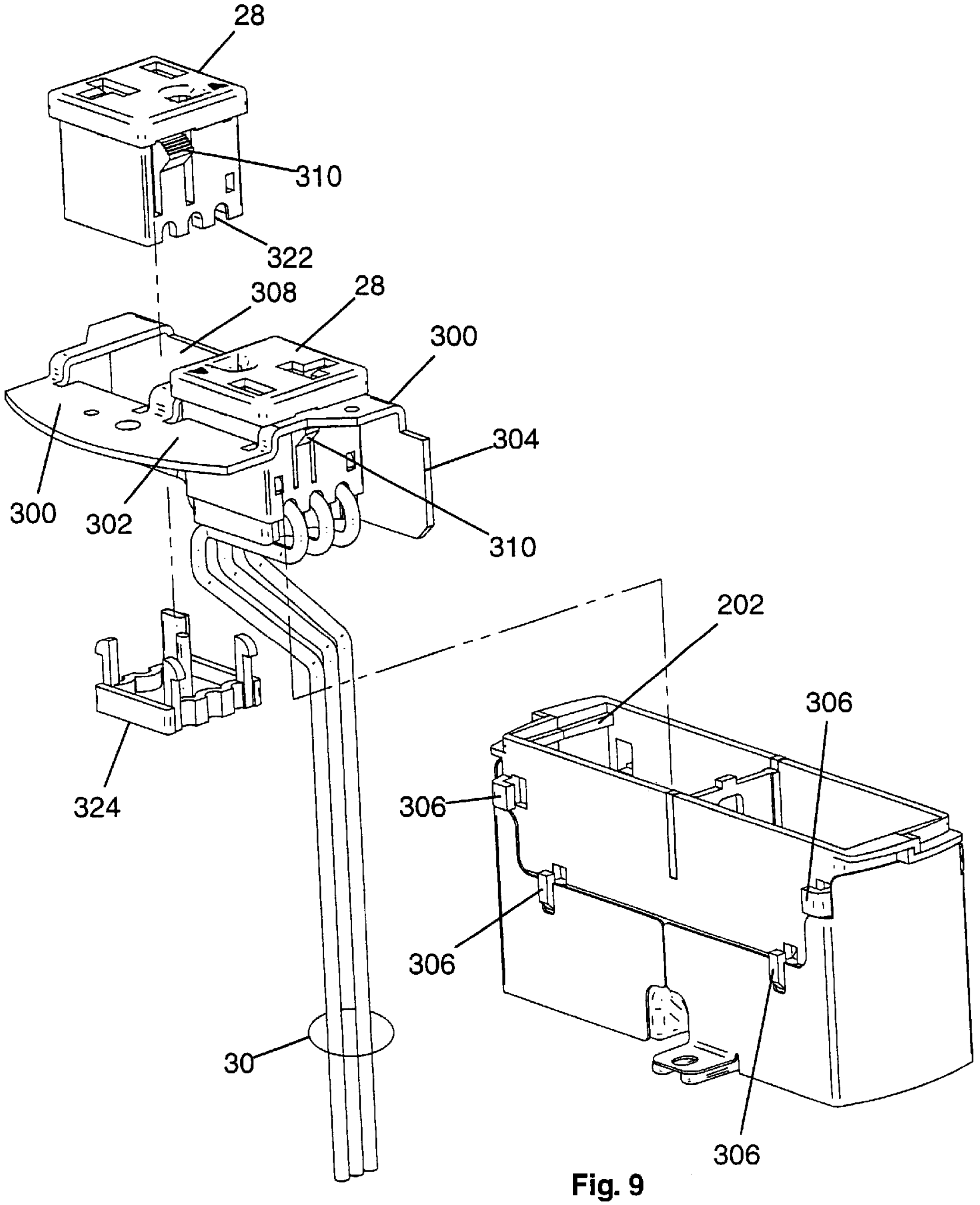
FIG. 9 is a perspective view illustrating the manner in which power receptacles are mounted in the fitting.

Referring to FIG. 9, the manner in which the power receptacles 28 are mounted and the poke-through will be described in greater detail. The poke-through 10 includes a pair of receptacle mounting brackets 300 that are adapted to slidably engage with the side walls of the data housing 20. Preferably, the mounting brackets 300 are formed of metal. Each of the receptacle mounting brackets 300 has a top plate 302 and a downwardly extending side plate 304. The side plates 304 are configured to slidably engage with flanges 306 formed in the side walls 42 of the data housing 20 to secure the receptacle mounting brackets thereto.

The electrical receptacles 28 are in the form of simplex receptacles which are configured to snap into mounting apertures 308 formed in the top plate 302 of the power receptacle mounting brackets 300. For this purpose, the housing of the power receptacle 28 includes a pair of opposing locking tabs 310 that extend outwardly from the housing. The mounting bracket top plate 302 is compressed between the locking tabs 310 and the top wall 312 of the receptacle 28 when the receptacle is inserted into the bracket 300. In use, the mounting brackets are not removable from the fitting once it is installed in the floor.

Preferably, the four power receptacles 28 are connected in dual, isolated circuits. In such instances, six power source conductor cables/wires are fed into the fitting through the EMT 64. In particular, each circuit includes a neutral conductor 30*a,* a line conductor 30*b,* and a ground conductor 30c. Alternatively, the receptacles may all be wired on a single circuit by branching feed wires from a single set of power supply wires. The conductors for a given circuit extend upwardly through the conduit 64 and are routed into one of the side spaces 26 of the chamber 14 through a wiring tunnel 320 formed in the bottom of the data housing 20. (See FIGS. 3, 5 and 6). The power connectors fit into grooves or slots 322 formed in the bottom of the power receptacles. As the wires are pushed into the slots 322, the insulation on the wires is abraded by terminals in the power receptacles, thereby completing the circuit between the source cables 30 and the power receptacles 28. Stuffer caps 324 are used to force the power cables into the terminals and connection slots 322 in the bottom of the receptacles. The stuffer caps 324 snap onto the bottoms of the receptacles 28.

As can be seen in FIG. 1, for example, the power receptacles 28 in a given pair (i.e., the receptacles on a given side of the center spaces) are positioned such that they face in opposite directions. More specifically, they are mounted with their ground slots facing each other. As a result, the line and neutral slots in the two associated power receptacles do not align with each other. Hence, for a given pair of power receptacles, the line and neutral cables must crisscross at the transition between the two power receptacles.

Referring to FIGS. 15–19, the manner in which the power covers 92 and communication/data covers 100 are connected to the cover plate 84 will be explained in greater detail. The cover plate 84 includes a pair of outer recess 400 and a central recess 404. The outer recesses 400 are positioned to overlay the side spaces 26 and the central recess 404 is positioned to overlay the central space 24.

Each of the outer recesses 400 is configured to carry two of the power covers 92. For this purpose, each of the recesses 400 is divided into a first portion 406 which carries a first cover 92a and a second portion 408 which carries a second cover 92*b*. These portions are generally delineated by a transverse support flange 410. The first and second covers 92*a*, 92*b* and the first and second recessed portions 406, 408 are mirror images of one another, respectively. Hence, only one cover and one recessed portion will be described. Specifically, installation of the left most cover 92*a* (in FIG. 15) cover 92*a* into the first portion 406 of the recess 400 will be described. The cover 92*a* has an outwardly extending flange 412 formed along a portion the lower end of its outer edge. This outwardly extending flange 412 is configured to slidably engage in a horizontal groove 414 formed in the outer edge of the recess 400. The cover 92*a* also includes a bent leg 416 extending from its bottom along a portion of its inner edge. This bent leg 416 is configured to slidably engage with a reciprocal bent leg 418 formed along a portion of the inner edge of the recess.

Once installed, the cover 92*a* is normally biased inwardly to its closed position by a spring 420. The spring 420 is mounted on a post 422 formed in the bottom of the recess. The spring has a first leg 424 that engages against the body of the cover plate and a second leg 426 that is positioned to engage against a spring post 428 that extends downwardly from the slider cover 92*a*. As the cover 92*a* is moved outwardly (in the direction of arrow 425), the spring post 428 engages against the second leg 426 of the spring 420, thereby compressing the spring 420. When the cover 92*a* is released, the force of the spring 420 returns the cover to its closed, inner position. A slot 430 is formed in the recess so as to slidably receive the spring post 428 (see FIG. 17). The interface between the spring post 428 and the outer end of the slot 430 functions as a stop to limit outward travel of the slider 92.

The cover 92*a* is installed by initially tilting the outer edge downward and inserting the outer flange 412 into the reciprocal groove 414. The cover 92*a* is then moved inwardly (in the direction opposite the arrow 425) until its bent leg 416 is positioned inwardly of the bent leg 418 in the recess. At this position, the spring post 428 is also positioned inwardly of the spring 420. The inner edge of the cover 92*a* is pivoted downward (in the direction of the arrow 434) until the cover is seated in the recess. The cover 92*a* is then slid outwardly (in the direction of arrow 425) until the bent leg 416 on the cover moves past a flange on notch 436 formed on the bent leg 418, thereby locking the cover 92*a* in place. The interface between the notch 436 and the bent leg 416 also serves to limit inward movement (i.e., opposite arrow 425) of the cover 92*a*. The second cover 92*b* is installed in the same manner, except that the first cover 92*a* must be slid outwardly to provide clearance for the second cover 92*b* during its installation.

Referring additionally to FIG. 10, the four communication/data sliders or covers 100 are divided into first pair of covers, e.g., the two left cover 100 in FIG. 10, and a second pair of covers, e.g., the two right covers 100 in FIG. 10. The first pair of covers 100 are mounted in a first portion 504 of the central recess 404 and the second pair of covers are mounted in a second portion 506 of the recess 404. The first and second portions 504, 506 of the recess are delineated by a transverse flange 508 that also serves as an inner stop for the inner covers 102. Each pair of covers includes a first or outer cover 104 that is slidably connected to the cover plate along a first generally horizontal plane 510. In this respect, the outer cover includes outwardly extending flanges 514 that are configured to slidably engage with a reciprocal set of upper grooves 516 formed in the outer edges of the central recess. Each pair of covers also includes a second or inner cover 102 slidably that is connected to the cover plate along a second generally horizontal plane 512 that is different from the first plane 510. In this respect, the inner cover includes outwardly extending flanges 520 that are configured to slidably engage with a reciprocal set of lower grooves 522 formed in the outer edges of the central recess. Hence, in the illustrated embodiment, the inner cover slides in a plane that is below outer cover, such that the inner cover can be slid underneath the outer cover. The covers 102, 104 are installed into the cover plate by first sliding the inner cover 102 into the lower set of grooves 522. Inward travel of the inner cover 102 is limited by the transverse flange 508. The outer cover 104 is then slid into the upper set of grooves 516. Tabs 530 (see FIG. 10) formed on the outer edges of the flanges 514 lock the outer cover 104 into the grooves 516.

What is claimed is:

1. In a flush poke-through wiring fitting that is adapted to be supported in a floor opening in a floor of a building structure; that includes an insert having an upper end adjacent to the floor and having a chamber defined therein which extends downwardly from the upper end; that has a fire stopping material disposed in the insert so that the fire rating of the floor, with the floor opening formed in the floor and with the poke-through wiring fitting supported in the floor opening, is substantially the same as the fire rating of the floor without the floor opening formed in the floor; that is adapted to have source power service cables and source communication/data signal service cables connected with the poke-through wiring fitting, which source power and source signal service cables may be disposed in a plenum below the floor before the floor opening is formed; and that has a top assembly which is connected with the upper end of the insert, which overlies the floor opening and which has an upper, outwardly facing surface, the improvement comprising:

first means for internally mounting four communication/data jacks within the fitting the first means including a portion that is height adjustable relative to the top assembly such that data jacks of varying heights can be internally mounted in the fitting in a protected fashion such that the data jacks do not extend upwardly beyond the outwardly facing surface of the top assembly; and second means for internally mounting four power receptacles within the fitting in a protected fashion such that the power receptacles do not extend upwardly beyond the outwardly facing surface of the top assembly.

2. The poke-through fitting of claim 1, wherein each of the data jacks has a first end carrying a connection terminal adapted to receive a reciprocal connector and a second end adapted for connection to a source service cable, the first means supporting the data jack such that the second end is contained within the chamber and the first end of the connector is recessed below the top assembly in a protected fashion and is accessible through the top assembly.

3. The poke-through of claim 1, further comprising fitting data housing which physically separates and electrically isolates the source a barrier disposed in the chamber and separating the connection in the chamber between the source power service cable and the power receptacle and the connection in the chamber between the source signal service cable and the data jacks so as to shield the connection between the source signal service cable and the signal jack from electromagnetic interference and radio frequency interference from the connection between the source power service cable and the power receptacle.

4. The improved poke-through fitting of claim 1, further comprising means for shielding the communication/data jacks from electromagnet interference and from radio frequency interference.

5. The improved poke-through fitting of claim 1, wherein the power receptacles are electrically wired in a single circuit.

6. The improved poke-through fitting of claim 1, wherein two of the electrical receptacles are wired in a first electrical circuit and the other two electrical receptacles are wired in a second electrical circuit that is electrically isolated from the first electrical circuit.

7. The improved poke-through fitting of claim 1, wherein the top assembly includes a cover plate, the cover plate having a body portion and a plurality of access covers movably connected with the body portion, each access cover being associated with a different one of the communication/data jacks and being movable between a first position at which the cover overlies the associated communication/data jack to prevent access thereto and a second position at which the associated communication/data jack is exposed to provide access thereto.

8. The improved poke-through fitting of claim 7, wherein the access covers are slidably connected to the main body portion.

9. The improved poke-through fitting of claim 7, wherein the cover plate further has a plurality of second access covers movably connected with the body portion, each of the second access cover being associated with a different one of the power receptacles and being movable between a first position at which the cover overlies the associated power receptacle to prevent access thereto and a second position at which the associated power receptacle is exposed to provide access thereto.

10. A flush poke-through wiring fitting that is adapted to be supported in a floor opening in a floor of a building structure, the poke-through fitting comprising:

an insert having an upper end adjacent to the floor and having a chamber defined therein which extends downwardly from the upper end;

a fire stopping material disposed in the insert so that the fire rating of the floor, with the floor opening formed in the floor and with the poke-through wiring fitting supported in the floor opening, is substantially the same as the fire rating of the floor without the floor opening formed in the floor; and a top assembly which is connected with the upper end of the insert, which overlies the floor opening and which has an upper, outwardly facing surface; and first means for internally mounting four communication/data jacks within the fitting in a protected fashion wherein the data jacks do not extend upwardly beyond the outwardly facing surface of the top assembly;

second means for internally mounting four power receptacles within the fitting in a protected fashion wherein the power receptacles do not extend upwardly beyond the outwardly facing surface of the top assembly.

11. The poke-through of claim 10, wherein the first means comprises a mounting bracket adapted to support at least four communication/data jacks in the chamber, the mounting bracket including a portion that is height adjustable relative to the top assembly such that data jacks of varying heights can be internally mounted in the fitting in a protected fashion wherein the data jacks do not extend upwardly beyond the outwardly facing surface of the top assembly.

12. The poke-through fitting of claim 10, further comprising means for shielding the communication/data jacks from electromagnet interference and from radio frequency interference.

13. The poke-through fitting of claim 10, wherein the power receptacles are electrically wired in a single circuit.

14. The poke-through fitting of claim 10, wherein two of the electrical receptacles are wired in a first electrical circuit and the other two electrical receptacles are wired in a second electrical circuit that is electrically isolated from the first electrical circuit.

15. The poke-through fitting of claim 10, wherein the top assembly includes a cover plate, the cover plate having a body portion and a plurality of access covers movably connected with the body portion, each access cover being associated with a different one of the communication/data jacks and being movable between a first position at which the cover overlies the associated communication/data jack to prevent access thereto and a second position at which the associated communication/data jack is exposed to provide access thereto.

16. The poke-through fitting of claim 15, wherein the access covers are slidably connected to the main body portion.

17. The poke-through fitting of claim 15, wherein the cover plate further has a plurality of second access covers movably connected with the body portion, each of the second access cover being associated with a different one of the power receptacles and being movable between a first position at which the cover overlies the associated power receptacle to prevent access thereto and a second position at which the associated power receptacle is exposed to provide access thereto.

18. A flush poke-through wiring fitting that is adapted to be supported in a floor opening in a floor of a building structure, the poke-through fitting comprising:

an insert having an upper end adjacent to the floor and having a chamber defined therein which extends downwardly from the upper end;

a fire stopping material disposed in the insert so that the fire rating of the floor, with the floor opening formed in the floor and with the poke-through wiring fitting supported in the floor opening, is substantially the same as the fire rating of the floor without the floor opening formed in the floor;

a top assembly which is connected with the upper end of the insert, which overlies the floor opening and which has an upper, outwardly facing surface;

a data housing disposed in the upper chamber, the data housing dividing the upper chamber into a central portion and a pair of radially outer side portions;

at least one data mounting bracket disposed in the central portion, the at least one mounting bracket being adapted to support a plurality of communication/data jacks within the data housing such that the data jacks do not extend upwardly beyond the outwardly facing surface of the top assembly; and a pair of power receptacle mounting brackets, each of the power receptacle mounting brackets being disposed in one of the outer side portions and being adapted to support at least one electrical receptacle within the fitting in a protected fashion such that the power receptacle does not extend upwardly beyond the outwardly facing surface of the top assembly.

19. The poke-through fitting of claim 18, wherein two data mounting brackets are mounted in the central portion, each of the mounting brackets comprising one of a flush mounting bracket and a recessed mounting bracket, the flush mounting bracket being adapted to support a pair of communication/data jacks in a flush mounted position wherein the bracket is generally aligned with the top of the data housing, the recessed mounting bracket being adapted to support a pair of communication/data jacks in a recessed mounted position wherein the bracket is recessed below the top of the data housing by a predetermined amount.

20. The poke-through fitting of claim 18, wherein the communication mounting bracket includes a portion that is height adjustable relative to the top assembly such that data jacks of varying heights can be internally mounted in the fitting in a protected fashion wherein the data jacks do not extend upwardly beyond the outwardly facing surface of the top assembly.

21. The poke-through fitting of claim 18, wherein the data housing is adapted to support the mounting bracket at either a flush mount position at which the mounting bracket is generally flush with the top of the data housing or a recessed position at which the mounting bracket is recessed from the top of the data housing by a predetermined amount.

22. The poke-through fitting of claim 18, wherein each of the power receptacle mounting brackets is adapted to support a pair of simplex outlets.

23. The poke-through fitting of claim 18, wherein the power receptacle mounting brackets are removable connected to the data housing.

24. The poke-through fitting of claim 21, wherein the power receptacle mounting brackets slidably engage with the data housing.

25. The poke-through fitting of claim 18, wherein the power receptacles are adapted to slidably engage into the mounting brackets.

26. The poke-through fitting of claim 18, wherein the data housing is comprised of a dielectric material.

27. The poke-through fitting of claim 26, wherein the data housing is comprised of polyvinyl chloride.

28. The poke-through fitting of claim of claim 27, wherein the data housing includes a metallic shield disposed about it exterior.

29. The poke-through fitting of claim 18, further comprising means for routing source power cables into the outer portions of the upper chamber for connection with the power receptacles and means for routing source signal communication/data cables into the inner portion of the upper chamber for connection with the communication/data jacks.

30. The poke-through fitting of claim 18, further comprising a cover plate having a body portion and a plurality of access covers movably connected with the body portion, each access cover being associated with a different one of the communication/data jacks and being movable between a first position at which the cover overlies the associated communication/data jack to prevent access thereto and a second position at which the associated communication/data jack is exposed to provide access thereto.

31. The poke-through fitting of claim 30, wherein the access covers are slidably connected to the main body portion.

32. The poke-through fitting of claim 30, wherein the cover plate further has a plurality of second access covers movably connected with the body portion, each of the second access cover being associated with a different one of the power receptacles and being movable between a first position at which the cover overlies the associated power receptacle to prevent access thereto and a second position at which the associated power receptacle is exposed to provide access thereto.

33. A flush poke-through wiring fitting of the type that is adapted to be supported in a floor opening in a floor of a building structure, the poke-through fitting including a fire stopping material so that the fire rating of the floor, with the floor opening formed in the floor and with the poke-through wiring fitting supported in the floor opening, is substantially the same as the fire rating of the floor without the floor opening formed in the floor, the poke-through fitting comprising:

first means for internally mounting four communication/data jacks within the fitting in a protected fashion wherein the data jacks do not extend upwardly beyond the top of the fitting; and second means for internally mounting four power receptacles within the fitting in a protected fashion wherein the power receptacles do not extend upwardly beyond the top of the fitting; and a cover plate overlaying the communication/data jacks and the power receptacles, the cover plate comprising a body portion, a plurality of access covers movably connected with the body portion, and a second plurality of access covers movably connected to the body portion, each of the first access cover being associated with a different one of the communication/data jacks and being movable between a first position at which the cover overlies the associated communication/data jack to prevent access thereto and a second position at which the associated communication/data jack is exposed to provide access thereto, each of the second access covers being associated with a different one of the power receptacles and being movable between a first position at which the cover overlies the associated power receptacle to prevent access thereto and a second position at which the associated power receptacle is exposed to provide access thereto.

34. A flush poke-through wiring fitting of the type that is adapted to be supported in a floor opening in a floor of a building structure, the poke-through fitting including a fire stopping material so that the fire rating of the floor, with the floor opening formed in the floor and with the poke-through wiring fitting supported in the floor opening, is substantially the same as the fire rating of the floor without the floor opening formed in the floor, the poke-through fitting comprising:

four communication/data jacks mounted within the fitting in a protected fashion wherein the data jacks do not extend upwardly beyond the top of the fitting, and wherein the communication/data jacks are arranged in a longitudinal row; and a cover plate overlaying the communication/data jacks, the cover plate comprising a body portion and four access covers slidably connected to the body portion in a longitudinal row each of the access covers being associated with a different one of the communication/data jacks and being slidable between a first position at which the cover overlies the associated communication/data jack to prevent access thereto and a second position at which the associated communication/data jack is exposed to provide access thereto and wherein the covers are movable such that each of the communication/data jacks can be exposed or covered independent of the other communication/data jacks.

35. The poke-through fitting of claim 34, wherein the communication/data covers further comprise first and second pairs of data communication covers, each pair comprising a first cover that is slidably connected to a the body portion along a first generally horizontal plane and a second cover that is slidably connected to the body portion along a second generally horizontal plane that is different from the first generally horizontal plane.

36. The poke-through fitting of claim 34, wherein one cover in each pair of covers is configured to slide under the other cover in a respective pair.

37. A cover plate for a flush poke-through wiring fitting of the type that is adapted to be supported in a floor opening in a floor of a building structure, the poke-through fitting including a fire stopping material so that the fire rating of the floor, with the floor opening formed in the floor and with the poke-through wiring fitting supported in the floor opening, is substantially the same as the fire rating of the floor without the floor opening formed in the floor, the cover plate comprising:

a body portion connectable to the fitting and configured to overly the floor opening; and a first access cover slidably connected to the body portion along a first plane; and a second access cover slidably connected to the body portion along a second plane below the first plane such that the second access cover can be slid under the first access cover.

38. A cover plate for a flush poke-through wiring fitting of the type that is adapted to be supported in a floor opening in a floor of a building structure, the poke-through fitting including a fire stopping material so that the fire rating of the floor, with the floor opening formed in the floor and with the poke-through wiring fitting supported in the floor opening, is substantially the same as the fire rating of the floor without the floor opening formed in the floor, the poke-through fitting further including a pair of communication/data devices mounted therein, the cover plate comprising:

a body portion connectable to the fitting and configured to overly the floor opening; and a first access cover associated with a first one of the communication/data devices and slidably connected to the body portion along a first plane for movement between a first position at which the cover overlies the first communication/data device to prevent access thereto and a second position at which the first communication/data device is exposed to provide access thereto;

a second access cover slidably connected to the body portion along a second plane below the first plane such that the second access cover can be slid under the first access cover, the second access cover being slidable between first position overlying the second communication/data device to prevent access thereto, a second position which coincides with the first position of the first cover and at which the second communication/data device is exposed and the first communication/data device is covered, and a third position which coincides with the second position of the second cover and at which the first and second communication/data device are both exposed.

39. A flush poke-through wiring fitting that is adapted to be supported in a floor opening in a floor of a building structure, the poke-through fitting comprising:

an insert having an upper end adjacent to the floor and having a chamber defined therein which extends downwardly from the upper end;

a fire stopping material disposed in the insert so that the fire rating of the floor, with the floor opening formed in the floor and with the poke-through wiring fitting supporting in the floor opening, is substantially the same as the fire rating of the floor without the floor opening formed in the floor; a cover overlaying the insert, the cover having an upper surface;

four communication/data jacks mounted within the fitting such that the communication/data jacks do not extend upwardly beyond the upper surface of the cover;

four power receptacles mounted within the fitting such that the power receptacles do not extend upwardly beyond the upper surface of the cover; and means for shielding the communication/data jacks from electromagnet interference and from radio frequency interference.

* * * * *